US012755739B2

(12) United States Patent
Lee et al.

(10) Patent No.: US 12,755,739 B2
(45) Date of Patent: Oct. 6, 2026

(54) DISPLAY DEVICE AND METHOD OF OPERATING THE SAME

(71) Applicant: Samsung Electronics Co., Ltd., Suwon-si (KR)

(72) Inventors: Sangyoung Lee, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 360 days.

(21) Appl. No.: 18/535,151

(22) Filed: Dec. 11, 2023

(65) Prior Publication Data

US 2024/0194204 A1 Jun. 13, 2024

Related U.S. Application Data

(63) Continuation of application No. PCT/KR2023/020139, filed on Dec. 7, 2023.

(30) Foreign Application Priority Data

Dec. 8, 2022 (KR) ........................ 10-2022-0170957

(51) Int. Cl.
*G10L 17/04* (2013.01)
*G10L 17/02* (2013.01)
(Continued)

(52) U.S. Cl.
CPC .............. *G10L 17/04* (2013.01); *G10L 17/02* (2013.01); *G10L 17/06* (2013.01); *G10L 17/26* (2013.01)

(58) Field of Classification Search
CPC ......... G10L 17/04; G10L 17/02; G10L 17/06; G10L 17/26; G10L 15/08; G10L 15/26;
(Continued)

(56) References Cited

U.S. PATENT DOCUMENTS 7,515,770 B2 4/2009 Fukada
8,379,801 B2 2/2013 Romriell et al.
(Continued)

FOREIGN PATENT DOCUMENTS

JP 2005-227944 8/2005
JP 3848319 11/2006
(Continued)

OTHER PUBLICATIONS

International Search Report, PCT/ISA/210, dated Mar. 12, 2024, in International Application PCT/KR2023/020139.

*Primary Examiner* — Huyen X Vo
(74) *Attorney, Agent, or Firm* — STAAS & HALSEY LLP

(57) ABSTRACT

Provided is a display device including a memory for storing one or more instructions and at least one processor for executing the one or more instructions stored in the memory to obtain a first character string by using a character recognition model to determine whether there is at least one character on a play screen of content and recognizing a character string including the at least one character in response to determining that there is the at least one character on the play screen of the content, obtain a second character string including at least one character by using a speech recognition model to determine whether there is speech in audio data included in a play section of the content where there is the at least one character, and recognizing the speech and converting the recognized speech into a character string in response to determining that there is the speech in the audio data, and compare the first character string with the second character string and update the character recognition model based on a mismatched part.

20 Claims, 14 Drawing Sheets

(51) Int. Cl.
*G10L 17/06* (2013.01)
*G10L 17/26* (2013.01)

(58) Field of Classification Search
CPC ...... G10L 15/02; G06V 10/82; G06V 20/635; G06V 20/62; G06V 30/10; G06F 3/167; G06F 3/16; G06F 3/0484
See application file for complete search history.

(56) References Cited

U.S. PATENT DOCUMENTS

| | | | | |
|---|---|---|---|---|
| 10,176,392 | B2 * | 1/2019 | Blanchflower | G06V 30/224 |
| 11,216,684 | B1 * | 1/2022 | Mahyar | G06V 20/46 |
| 2007/0011012 | A1 * | 1/2007 | Yurick | G10L 15/26 704/277 |
| 2014/0379337 | A1 | 12/2014 | Pham | |
| 2015/0088508 | A1 | 3/2015 | Bharadwaj et al. | |
| 2019/0050666 | A1 | 2/2019 | Kim et al. | |
| 2021/0037274 | A1 | 2/2021 | Gupta et al. | |
| 2021/0195283 | A1 | 6/2021 | Choi et al. | |
| 2022/0012520 | A1 | 1/2022 | Mok et al. | |
| 2022/0382964 | A1 * | 12/2022 | Maeda | G06F 40/171 |
| 2023/0197085 | A1 * | 6/2023 | Dong | G10L 17/20 704/233 |

FOREIGN PATENT DOCUMENTS

| | | |
|---|---|---|
| JP | 2021-12466 | 2/2021 |
| JP | 6936318 | 9/2021 |
| KR | 2001-0002739 | 1/2001 |
| KR | 10-0828166 | 5/2008 |
| KR | 10-2017-0101076 | 9/2017 |
| KR | 10-1819459 | 1/2018 |
| KR | 10-2019-0132909 | 11/2019 |
| KR | 10-2020-0095947 | 8/2020 |

* cited by examiner

FIG. 12

| | SPEECH RECOGNITION RESULT (SECOND CHARACTER STRING) | CHARACTER RECOGNITION RESULT (FIRST CHARACTER STRING) |
|---|---|---|
| 1회차 | PATENT | PATENT |
| 2회차 | PATENT | PARENT |
| 3회차 | PARENT | PARENT |
| 4회차 | FATTEN | PATENT |
| 5회차 | PATENT | PARENT |

DISPLAY DEVICE AND METHOD OF OPERATING THE SAME

CROSS-REFERENCE TO RELATED APPLICATIONS

This application is a continuation application of International Application PCT/KR2023/020139, filed Dec. 7, 2023, which is incorporated herein by reference in its entirety, it being further noted that foreign priority benefit is based upon Korean Patent Application No. 10-2022-0170957, filed Dec. 8, 2022, the disclosure of which is incorporated by reference herein in its entirety.

TECHNICAL FIELD

Various embodiments of the disclosure relate to a display device and method of operating the same. More specifically, the disclosure relates to a display device and method of operating the same, which compares a character string of content recognized using a character recognition model with a character string of the content recognized using a speech recognition model to update the character recognition model based on a mismatched part.

BACKGROUND ART

Display devices recognize a character included in a content by using a character recognition model, and use a result of the recognizing for various purposes such as caption recognition.

However, the display device merely recognizes characters and uses the result, but has difficulty in evaluating accuracy in character recognition performed by the device. This is because, although a criterion to evaluate the accuracy is required to evaluate the accuracy in character recognition, the display device has no such criterion to evaluate the accuracy in a real environment.

To evaluate the accuracy of the character recognition model, the display device usually needs to perform an extra procedure for measuring the accuracy of the recognition model by using a data set that already knows ground truth (GT).

Furthermore, to increase the accuracy of the character recognition model, the display device needs to generate a data set required for additional learning and provide the data set to the character recognition model.

DISCLOSURE

Technical Solution

According to an embodiment of the disclosure, a display device may include a memory for storing one or more instructions. According to an embodiment of the disclosure, the display device may include at least one processor. The at least one processor may be configured to execute the one or more instructions stored in the memory to obtain a first character string by using a character recognition model to determine whether there is at least one character on a play screen of content and recognizing a character string including the at least one character as the first character string in response to determining that there is the at least one character on the play screen of the content. The at least one processor may be configured to execute the one or more instructions stored in the memory to obtain a second character string including at least one character by using a speech recognition model to determine whether there is speech in audio data included in a play section of the content where there is the at least one character, and recognizing the speech and converting the recognized speech into a character string as the second character string in response to determining that there is the speech in the audio data, and The at least one processor may be configured to execute the one or more instructions to compare the first character string with the second character string and update the character recognition model based on a mismatched part.

According to an embodiment of the disclosure, a method of operating a display device may include obtaining a first character string by using a character recognition model to determine whether there is at least one character on a play screen of content of content and recognizing a character string including the at least one character as the first character string in response to determining that there is the at least one character on the play screen of the. The method may include obtaining a second character string including at least one character by using a speech recognition model to determine whether there is speech in audio data included in a play section where there is the at least one character, and recognizing the speech and converting the recognized speech into a character string as the second character string in response to determining that there is the speech in the audio data. The method may include comparing the first character string with the second character string to update the character recognition model based on a mismatched part.

According to an embodiment of the disclosure, a computer-readable recording medium may include a program to embody a method of operating a display device including obtaining a first character string by using a character recognition model to determine whether there is at least one character on a play screen of content of content and recognizing a character string including the at least one character in response to determining that there is the at least one character on the play screen of the content. According to an embodiment of the disclosure, a computer-readable recording medium may include a program to embody a method of operating a display device including obtaining a second character string including at least one character by using a speech recognition model to determine whether there is speech in audio data included in a play section where there is the at least one character, and recognizing the speech and converting the recognized speech into a character string in response to determining that there is the speech in the audio data, and According to an embodiment of the disclosure, a computer-readable recording medium may include a program to embody a method of operating a display device including comparing the first character string with the second character string to update the character recognition model based on a mismatched part.

DESCRIPTION OF DRAWINGS

FIG. 12 is a diagram illustrating results when a display device repeats a procedure for obtaining a first character string and a second character string five times each, according to an embodiment of the disclosure.

MODE FOR INVENTION

Figure 1:
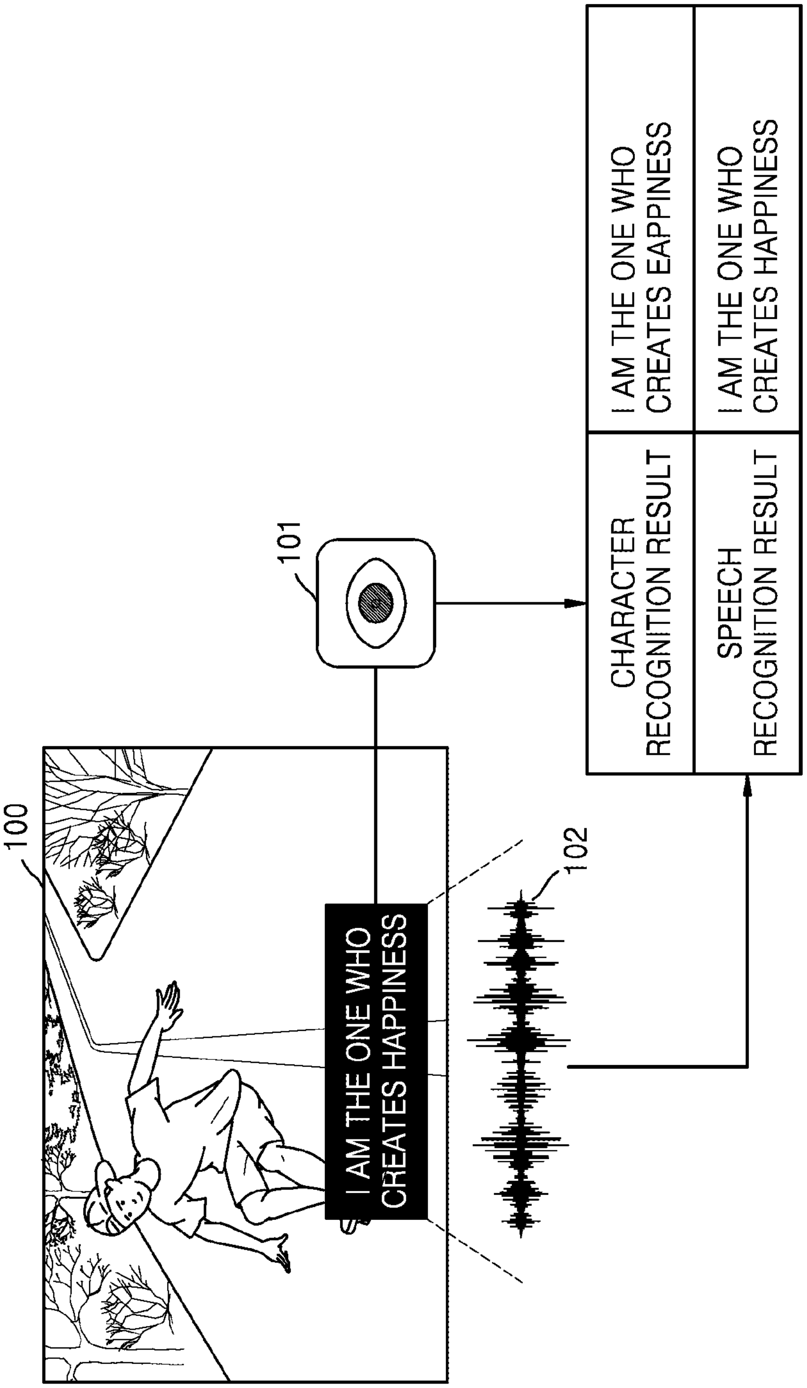
FIG. 1 illustrates how a display device operates, according to an embodiment of the disclosure.

Embodiments of the disclosure will now be described with reference to accompanying drawings to assist those of ordinary skill in the art in readily implementing them. However, the embodiments of the disclosure may be implemented in many different forms, and not limited thereto as will be discussed herein.

The terms are selected as common terms widely used now, taking into account principles of the disclosure, which may however depend on intentions of those of ordinary skill in the art, judicial precedents, emergence of new technologies, and the like. Therefore, the terms should not only be construed by their names, but should be defined based on their meanings and descriptions throughout the disclosure.

The terminology as used herein is only used for describing particular embodiments of the disclosure and not intended to limit the disclosure.

When A is said to "be connected" to B, it means to be "directly connected" to B or "electrically connected" to B with C located between A and C.

Throughout the specification, in claims in particular, "the" and the similar term are used to denote a thing or things already mentioned or assumed to be common knowledge. Operations for describing a method according to the disclosure may be performed in a suitable order unless the context clearly dictates otherwise. The disclosure is not, however, limited to the described order of the operations.

Expressions such as 'in some embodiments' or 'in an embodiment' mentioned throughout the specification are not intended to indicate the same embodiment.

Some embodiments of the disclosure may be described in terms of functional block elements and various processing operations. Some or all of the functional blocks may be implemented by any number of hardware and/or software components configured to perform the specified functions. For example, the functional blocks may be implemented by one or more microprocessors or circuit elements having dedicated functions. Furthermore, for example, the functional blocks may be implemented in various programing or scripting languages. The functional blocks may be implemented in algorithms executed on one or more processors. Moreover, the disclosure may employ any number of traditional techniques for electronic configuration, signal processing and/or data processing. The words "mechanism", "element", "means", and "component" are used broadly and are not limited to mechanical or physical embodiments.

Connecting lines or members between the elements illustrated in the accompanying drawings are illustratively shown as functional and/or physical connections or circuit connections. In practice, functional, physical, or circuit connections that may be replaced or added may be employed between the elements.

The terms "unit", "module", "block", etc., as used herein each represent a unit for handling at least one function or operation, and may be implemented in hardware, software, or a combination thereof.

The term 'user' as used herein refers to a person who uses a display device to control functions or operations of the display device, including a viewer, an administrator, or an installation engineer.

Throughout the specification, characters may refer to all kinds of visual symbol systems used to write human languages. For example, characters may include various languages such as numbers, Korean, English, etc.

Terminology such as "at least one of A or B", or "at least one of A, or B", as used herein, includes any of the following: A, B, A and B. Similarly, terminology such as "at least one of A, B, or C", or "at least one of A, B or C", as used herein, includes any of the following: A, B, C, A and B, A and C, B and C, A and B and C.

The disclosure will now be described with reference to accompanying drawings.

FIG. 1 illustrates how a display device operates, according to an embodiment of the disclosure.

A display device 100 may use an external imaging device or cable equipment such as a set-top box or over the top (OTT) to obtain a content transmitted from a broadcasting station.

From understanding that when information expressed in characters is recognized among various information included in the content, various functions that may be helpful to the user may be provided, the display device 100 may recognize characters included in the content and provide various services based on the recognized characters.

However, the characters included in the content have a free way or form of expression thereof, so they may have various font types, font sizes, positions, background colors, etc. Hence, there is a limit to collecting a prior training data set for character recognition, and it may be difficult to constantly maintain a level of accuracy in character recognition.

In an embodiment of the disclosure, the display device 100 may compare a character string of the content recognized using a character recognition model 101 with a character string of the content recognized using a speech recognition model 102, and update the character recognition model 101 based on a part mismatched with the character string of the content recognized using the speech recognition model 102.

In other words, the display device 100 may evaluate accuracy of the character recognition model 101 based on the character string of the content recognized using the speech recognition model 102, and increase the accuracy of the character recognition model 101 by further training the character recognition model 101 based on the character string of the content recognized using the speech recognition model 102.

Although the display device 100 in the embodiment of FIG. 1 may be a smart television (TV), it is merely an example and may be implemented in various forms.

For example, the display device 100 may be implemented in various forms such as a tablet personal computer (PC), a digital camera, a camcorder, a laptop computer, a netbook computer, a tablet PC, a desktop, an electric book terminal, a video phone, a digital broadcasting terminal, a personal digital assistant (PDA), a portable multimedia player (PMP), a navigation system, a wearable device, a smart refrigerator, or other home appliances.

Especially, the embodiment of the disclosure may be readily implemented in a display device including a large video output such as a TV, without being limited thereto. Furthermore, the display device 100 may be stationary or mobile, and may be a digital broadcast receiver capable of digital broadcast reception.

The display device 100 may be implemented not only as a flat display device but also as a curved display device having a curved screen or a flexible display device with adjustable curvature. The output resolution of the display device 100 may include, for example, high definition (HD), full HD, ultra HD or a resolution higher than ultra HD.

The display device 100 may play the obtained content.

The display device 100 may input image data obtained by capturing one of play screens of the content to the character recognition model 101, and when determining that there is at least one character in the image data, recognize a character string including the at least one character from the image data. The display device 100 may obtain the recognized character string as a first character string.

In the embodiment of FIG. 1, the display device 100 may input image data about a scene where a person is doing skating on a road to the character recognition model 101 to determine whether there is at least one character in the image data.

When there is at least one character in the input image data, the display device 100 may use the character recognition model 101 to recognize at least one character included in the image data.

In the embodiment of FIG. 1, the display device 100 may obtain a character recognition result value "I am the one who creates eappiness" as the first character string by recognizing at least one character included in the image data on the play screen where the person is doing skates on the road.

In an embodiment of the disclosure, the character recognition model 101 may be an artificial intelligence (AI) model. This will be described in detail later in connection with FIGS. 5 and 6.

The display device 100 may input audio data included in the content play section where the first character string obtained through the character recognition model 101 equally exists to the speech recognition model 102, to determine whether there is speech in the content play section.

In the disclosure, the term 'speech' may refer to a human voice. The speech may be distinguished from a 'sound source' referring to background music or sound effects. When there is speech in the play section, the display device 100 may obtain a second character string including at least one character by recognizing a speech and converting the recognized speech into a character or character string (speech-to-text: STT).

In the embodiment of the disclosure of FIG. 1, the display device 100 may input audio data included in the play section where the at least one character recognized in the scene where the person is doing skating on the road is equally displayed to the speech recognition model 102, to determine whether there is speech in the audio data. In the embodiment of FIG. 1, the display device 100 may input audio data included in a play section where the at least one character recognized in the scene where the person is doing skating on the road is equally displayed to the speech recognition model 102, to determine that there is speech in the audio data.

When there is speech in the audio data, the display device 100 may use the speech recognition model 102 to recognize the speech and convert the recognized speech to text or character string, thereby obtaining a character string "i am the one who creates happiness" as the second character string.

In an embodiment of the disclosure, the speech recognition model 102 may be an AI model. This will be described in detail later in connection with FIGS. 7 and 8.

The display device 100 may compare the first character string "i am the one who creates eappiness" obtained through the character recognition model 101 with the second character string "i am the one who creates happiness" obtained through the speech recognition model 102.

Statistically, a character string obtained through a speech recognition model is more accurate than a character string obtained through a character recognition model, so the display device 100 may determine accuracy of the character recognition model 101 based on the second character string obtained through the speech recognition model 102.

When there is a mismatch between the first character string and the second character string, it may be determined immediately that the character recognition result of the character recognition model 101 is not accurate.

When the first character string is mismatched with the second character string, the display device 100 may update the character recognition model 101 by analyzing the mismatched part.

In other words, the display device 100 may immediately determine whether a character recognition result of the character recognition model 101 is accurate, and update the character recognition model 101 when determining that the character recognition result is not accurate.

In general, to increase accuracy of the character recognition model 101, the display device 100 needs to generate a data set required for further training and train the character recognition model 101.

However, according to an embodiment of the disclosure, the display device 100 may easily obtain an instance of mismatch between the first character string and the second character string by comparing the first character string automatically obtained through the character recognition model 101 while playing the content with the second character string obtained through the speech recognition model 102.

Hence, there is no need to generate a data set required for extra training.

In an embodiment of the disclosure, when the first character string is mismatched with the second character string, the display device 100 may extract a feature of the image data input to the character recognition model 101 for character recognition and update the character recognition model 101 to output a correct result.

In an embodiment of the disclosure, the display device 100 may deactivate a function of automatically updating the character recognition model 101 to manage an available resource and play speed of the display device 100.

In an embodiment of the disclosure, the display device 100 may periodically activate the function of automatically updating the character recognition model. In this case, while the display device 100 is playing the content, accuracy of the character recognition model may increase automatically.

In an embodiment of the disclosure, the display device 100 may transmit the updated character recognition model 101 to a server (not shown) or another device to share it with the server or the other device.

In an embodiment of the disclosure, the display device 100 may receive an updated character recognition model from the server or the other device.

In an embodiment of the disclosure, the display device 100 may rapidly increase accuracy of the character recognition model by sharing the updated character recognition model with other external devices in real time.

Figure 2:
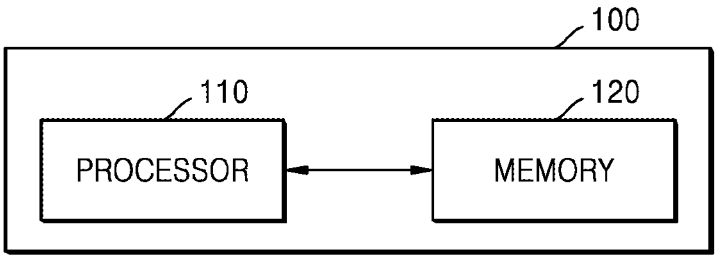
FIG. 2 is a block diagram illustrating a display device, according to an embodiment of the disclosure.

FIG. 2 is a block diagram illustrating a display device, according to an embodiment of the disclosure.

Referring to FIG. 2, the electronic device 100 may include a processor 110 and a memory 120.

The memory 120 may store a program for processing and controlling of the processor 110. The memory 120 may also store data input to or output from the display device 100.

The memory 120 may include at least one of an internal memory (not shown) or an external memory (not shown). The memory 120 may store control history information, current condition information and status information.

The memory 120 may include at least one type of storage medium including a flash memory, a hard disk, a multimedia card micro type memory, a card type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The internal memory may include, for example, at least one of a volatile memory (e.g., a dynamic RAM (DRAM), an SRAM, a synchronous DRAM (SDRAM), etc.), a non-volatile memory (e.g., a one-time programmable ROM (OTPROM), a PROM, an erasable PROM (EPROM), an EEPROM, a mask ROM, a flash ROM, etc.), a hard disc drive (HDD) or a solid state drive (SSD).

In an embodiment of the disclosure, the processor 110 may load an instruction or data received from at least one of the non-volatile memory or another component onto the volatile memory and process the instruction or data. Furthermore, the processor 110 may preserve data received from or generated by the other component in the non-volatile memory.

The external memory may include, for example, at least one of compact flash (CF), secure digital (SD), micro secure digital (Micro-SD), mini secure digital (Mini-SD), extreme digital (xD), or a memory stick.

The memory 120 may store the at least one instruction to be executed by the processor 110.

In an embodiment of the disclosure, the memory 120 may store various information input through an input/output module (not shown).

In an embodiment of the disclosure, the memory 120 may store instructions to control the processor 110 to, input a play screen of content of content to a character recognition model and when there is at least one character, recognize a character string including the at least one character, thereby obtaining a first character string, input audio data included in a play section of the content in which there is the at least one character to a speech recognition model, and when there is speech, recognize the speech and convert the recognized speech to a character string, thereby obtaining a second character string including the at least one character, and compare the first character string with the second character string and update the character recognition model based on a mismatched part.

The processor 110 may run an operating system (OS) and various applications stored in the memory 120 at the user's request or when a preset and stored condition is met.

The processor 110 may include a RAM to store a signal or data received from outside of the display device 100 or to be used for a storage sector corresponding to various tasks performed in the display device 100, and a ROM to store a control program to control the display device 100.

The processor 110 may include a single core, dual cores, triple cores, quad cores, and their multiple cores. The processor 110 may also include a plurality of processors. For example, the processor 110 may be implemented with a main processor (not shown) and a sub processor (not shown) activated in a sleep mode.

Furthermore, the processor 110 may include at least one of a central processing unit (CPU), a graphic processing unit (GPU) or a video processing unit (VPU). Alternatively, it may be implemented in the form of a system on chip (SoC) that integrates at least one of the CPU, the GPU or the VPU.

The processor 110 may execute one or more instructions stored in the memory 120 to control various components in the display device 100.

In an embodiment of the disclosure, the processor 110 may input a play screen of content to a character recognition model, and when there is at least one character, recognize a character string including the at least one character to obtain a first character string.

In an embodiment of the disclosure, the processor 110 may input audio data included in a play section of the content in which there is the at least one character to a speech recognition model, and when there is speech, recognize the speech and convert the recognized speech to a character string to obtain a second character string including the at least one character.

In an embodiment of the disclosure, the processor 110 may compare the first character string with the second character string and update the character recognition model based on a mismatched part.

In an embodiment of the disclosure, the processor 110 may input a play screen of the content to a first character recognition model to determine whether there is at least one character in the play screen.

In an embodiment of the disclosure, when there is the at least one character, the processor 110 may input the play screen to a second character recognition model to detect a character area.

In an embodiment of the disclosure, the processor 110 may compare a feature vector for the user with a feature vector for each of a plurality of contents to recommend the user at least one content based on similarity.

In an embodiment of the disclosure, the processor 110 may input the detected character area to a third character recognition model and recognize a character string including at least one character to obtain a first character string.

In an embodiment of the disclosure, when one of the first character string or the second character string is not obtained, the processor 110 may determine that there is an error in the first character recognition model for determining whether there is a character, and update the first character recognition model based on the play screen of the content and the second character string.

In an embodiment of the disclosure, when at least one character included in the second character string is omitted from the first character string, the processor 110 may recognize that there is an error in the second character recognition model for detecting a character area, and update the second character recognition model based on the play screen of the content and the second character string.

In an embodiment of the disclosure, when at least one character included in the second character string is not matched with a corresponding character in the first character string, the processor 110 may recognize that there is an error in the third character recognition model for recognizing a character, and update the third character recognition model based on the detected character area and the second character string.

In an embodiment of the disclosure, the processor 110 may input audio data included in a play section in which at least one character included in the first character string is displayed to a first speech recognition model to determine whether there is speech.

When there is speech, the processor 110 may input the speech to the second speech recognition model to recognize the speech, and convert the recognized speech into a character string to obtain a second character string including at least one character.

In an embodiment of the disclosure, the processor 110 may repeat the procedure for recognizing audio data included in the play section where at least one character exists and converting it into a character string multiple times and obtain the most frequent value of the converted character string as the second character string.

In an embodiment of the disclosure, the processor 110 may determine whether the first character string and the second character string are recognized in the same language.

In an embodiment of the disclosure, the processor 110 may extract a feature of the mismatched part, and update at least one of the first character recognition model for determining whether there is a character, the second character recognition model for detecting a character area, or the third character recognition model based on the extracted feature.

In an embodiment of the disclosure, the processor 110 may determine whether the function of automatically updating the character recognition model is activated.

In an embodiment of the disclosure, the processor 110 may manually activate or deactivate the function of automatically updating the character recognition model by receiving a user input through a user interface such as a button.

In an embodiment of the disclosure, the display device 110 may activate or deactivate the function of automatically updating the character recognition model by system settings.

The block diagram of the display device 100 as shown in FIG. 2 is merely for an embodiment. Components of the block diagram may be merged, added or omitted according to actual specifications of the display device 100. In other words, two or more components may be merged into one, or a single component may be split into two or more components as needed. Functions performed in the blocks are shown for explaining the embodiment of the disclosure, and the disclosure is not limited to the detailed operation or components corresponding to the blocks.

Figure 3:
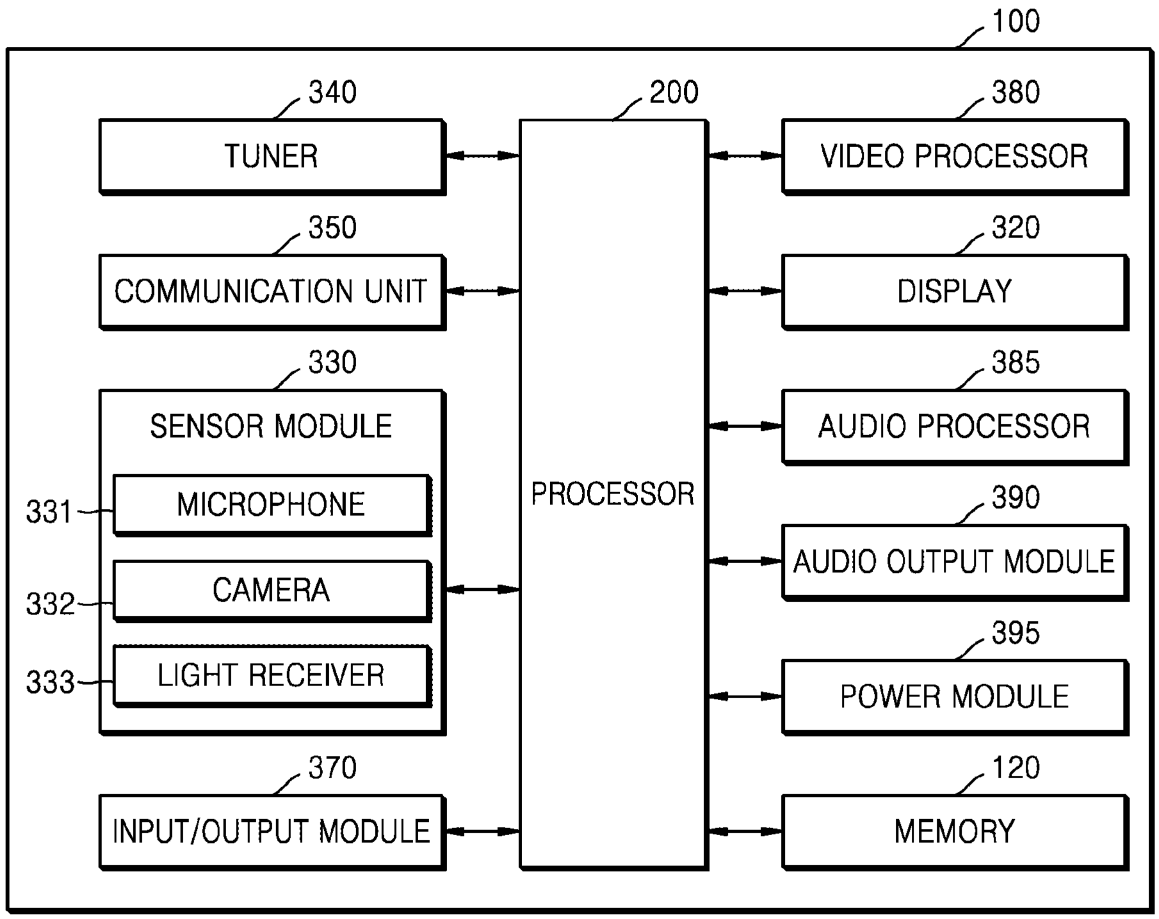
FIG. 3 is a block diagram illustrating a display device in detail, according to an embodiment of the disclosure.

FIG. 3 is a block diagram illustrating a display device in detail, according to an embodiment of the disclosure.

The display device 100 of FIG. 3 may be an embodiment of the display device 100 as described above in connection with FIGS. 1 and 2. For example, the display device 100 of FIG. 3 may be a display device such as a smart TV.

Referring to FIG. 3, the display device 100 may include a tuner 340, a processor 110, a display 320, a communication unit 350, a sensor module 330, an input/output module 370, a video processor 380, an audio processor 385, an audio output module 390, a memory 120, and a power module 395.

The processor 110 of FIG. 3 corresponds to the processor 110 of FIG. 2, and the memory 120 of FIG. 3 corresponds to the memory 120 of FIG. 2. Accordingly, what are described above will not be repeated.

In an embodiment of the disclosure, the communication unit 350 may include a wireless fidelity (Wi-Fi) module, a bluetooth module, an infrared communication module, a wireless communication module, a local area network (LAN) module, an Ethernet module, a wired communication module, etc. In this case, each communication module may be implemented in the form of at least one hardware chip.

The Wi-Fi module and the bluetooth module perform communication in a Wi-Fi scheme and a bluetooth scheme, respectively. In the case of using the Wi-Fi module or the bluetooth module, it may first transmit or receive various connection information such as a service set identifier (SSID) and a session key, use this to establish communication, and then transmit and receive various information. The wireless communication module may include at least one communication chip for performing communication according to various wireless communication standards such as zigbee, third generation (3G), third generation partnership project (3GPP), long term evolution (LTE), LTE advanced (LTE-A), fourth generation (4G), fifth generation (5G), etc.

In an embodiment of the disclosure, the communication unit 350 may receive a user input from an external device.

In an embodiment of the disclosure, the tuner 340 may tune in to and select a frequency of a channel that the display device 100 intends to receive among a lot of radio components through amplification, mixing, resonance of broadcast signals received wiredly or wirelessly. The broadcast signal includes audio, video, and additional information, e.g., electronic program guide (EPG).

The tuner 340 may receive broadcast signals from various sources such as terrestrial broadcasters, cable broadcasters, satellite broadcasters, Internet broadcasters, etc. The tuner 340 may also receive broadcast signals from a source such as an analog broadcaster or a digital broadcaster.

The sensor module 330 may detect the user around the display device 100, and may include at least one of a microphone 331, a camera 332 or a photo receiver 333.

The microphone 331 receives voice uttered by the user. The microphone 331 may convert the received voice into an electrical signal and output the electrical signal to the processor 110. The microphone 331 may employ various noise-eliminating algorithms to eliminate noise occurring in the course of receiving an external sound signal.

The camera 332 may obtain an image frame such as a still image or a moving image. An image captured by an image sensor may be processed by the processor 110 or an extra image processor (not shown).

Image frames processed by the camera 332 may be stored in the memory 120, or transmitted to an outside via the communication module 350. The camera 332 may be two or more in number depending on a configuration of the display device 100.

The photo receiver 333 receives an optical signal (including a control signal) from an external remote control device (not shown). The photo receiver 333 may receive an optical signal corresponding to a user input, e.g., touch, push, touching gesture, voice, or motion of the user, from the remote control device (not shown). A control signal may be extracted from the received optical signal under the control of the processor 110. For example, the photo receiver 333 may receive a control signal corresponding to a channel up/down button for switching channels from the remote control device.

Although the sensor module 330 is shown in FIG. 3 as including the microphone 331, the camera 332 and the photo receiver 333, it is not limited thereto, and may include at least one of a magnetic sensor, an acceleration sensor, a temperature/humidity sensor, an infrared sensor, a gyroscope sensor, a position sensor (e.g., a global positioning sensor (GPS)), an atmospheric pressure sensor, a proximity sensor, a red green blue (RGB) sensor, an illumination sensor, a radar sensor, a lidar sensor or a Wi-Fi signal receiver, without being limited thereto. Those of ordinary skill in the art may intuitively infer the functions of the respective sensors, so the detailed description thereof will be omitted.

Although the sensor module 330 of FIG. 3 is shown as being equipped in the display device 100, it is not limited thereto, and may be equipped in a control device such as a remote control device that is located separately from the display device 100 for communicating with the display device 100.

In a case that a control device for the display device 100 is equipped with the sensing module 330, the control device may digitize information detected by the sensing module 330 and transmit the result to the display device 100. The control device may communicate with the display device 100 by using short-range communication including infrared, Wi-Fi or bluetooth.

The input/output module 370 receives a video (e.g., a moving image), an audio (e.g., a speech, music, etc.), additional information (e.g., an EPG), or the like from outside of the display device 100 under the control of the processor 110. The input/output module 370 may include any of a high-definition multimedia interface (HDMI), a mobile high-definition link (MHL), a universal serial bus (USB), a display port (DP), a thunderbolt, a video graphics array (VGA) port, an RGB port, a D-subminiature (D-SUB), a digital visual interface (DVI), a component jack, and a PC port.

The video processor 380 processes video data received by the display device 100. The video processor 380 may perform various image processes such as decoding, scaling, noise removal, frame rate conversion, resolution conversion, etc., on the video data.

The display 320 converts an image signal, a data signal, an on-screen display (OSD) signal, a control signal, etc., processed by the processor 110 into a driving signal. The display 320 may be implemented by a plasma display panel (PDP), a liquid crystal display (LCD), organic light emitting diodes (OLEDs), a flexible display, or a three dimensional (3D) display, or the like. Furthermore, the display 320 may have a touchscreen to be used for an input device as well as for an output device.

The display 320 may output various contents input through the communication unit (not shown) or the input/output module 370 or output an image stored in the memory 120. Furthermore, the display 320 may output information input by the user through the input/output module 370 onto a screen.

The display 320 may include a display panel. The display panel may be an LCD panel, or a panel including various luminants such as light emitting diodes (LEDs), OLEDs, a cold cathode fluorescent lamp (CCFL), etc. Furthermore, the display panel may include not only a flat display device but also a curved display device having a curved screen or a flexible display device with adjustable curvature. The display panel may be a 3D display or an electrophoretic display.

The output resolution of the display panel may include, for example, HD, full HD, ultra HD or a resolution higher than ultra HD.

In the embodiment of the disclosure of FIG. 3, the display device 100 is shown as including the display 320, but it is not limited thereto. The display device 100 may be connected to a separate display device including a display through wired or wireless communication and configured to transmit a video/audio signal to the display device.

The audio processor 385 processes audio data. The audio processor 385 may perform various processes such as decoding, amplification, noise removal, etc., on the audio data. The audio processor 385 may include a plurality of audio processing modules to process audio corresponding to a plurality of contents.

The audio output module 390 outputs audio included in a broadcast signal received through the tuner 340 under the control of the processor 110. The audio output module 390 may output audio, e.g., voice or sound, received through the communication module 350 or the input/output module 370. Furthermore, the audio output module 390 may output audio stored in the memory 120 under the control of the processor 110. The audio output module 390 may include at least one of a speaker, a headphone output terminal or a Sony/Phillips digital interface (S/PDIF) output terminal.

The power module 395 supplies power received from an external power source to the components in the display device 100 under the control of the processor 110. Furthermore, the power module 395 may supply power output from one or two or more batteries (not shown) located in the display device 100 to the internal components under the control of the processor 110.

The memory 120 may store various data, programs, or applications for driving and controlling the display device 100 under the control of the processor 110. Although not shown, the memory 120 may include a broadcast reception module, a channel control module, a volume control module, a communication control module, a speech recognition module, a motion recognition module, a photo reception module, a display control module, an audio control module, an external input control module, a power control module, a power control module of a wirelessly connected external device, a speech database (DB), or a motion DB. The modules and DBs of the memory 120 may be implemented in software to perform a broadcast reception control function, a channel control function, a volume control function, a communication control function, a speech recognition function, a motion recognition function, photo reception control function, a display control function, an audio control function, an external input control function, a power control function or a power control function of the wirelessly (e.g., bluetooth) connected external device. The processor 110 may use the software stored in the memory 120 to perform each of the functions.

The block diagram of the display device 100 as shown in FIG. 3 is merely an example that is implemented in an embodiment. Components of the block diagram may be merged, added or omitted according to actual specifications of the display device 100. In other words, two or more components may be merged into one, or a single component may be split into two or more components as needed. Functions performed in the blocks are shown for explaining the embodiment of the disclosure, and the disclosure is not limited to the detailed operation or components corresponding to the blocks.

Figure 4:
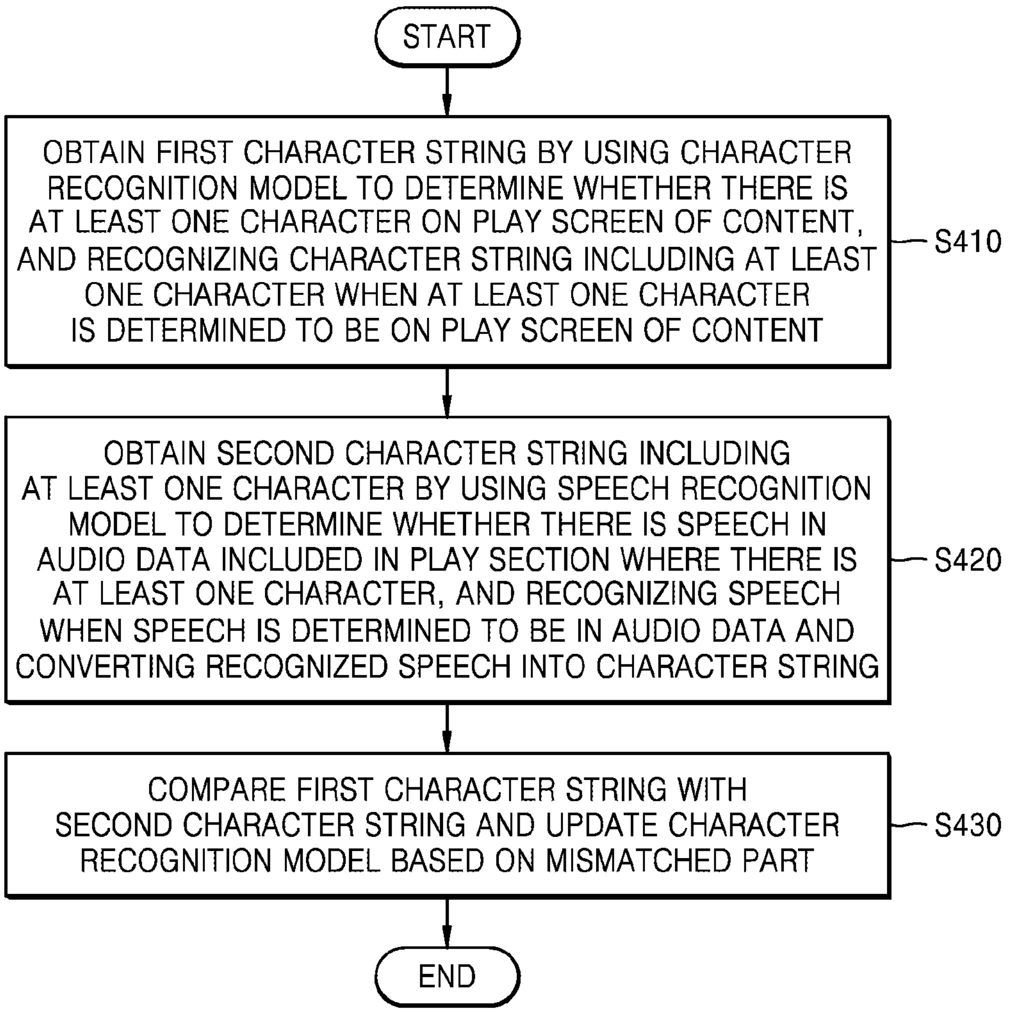
FIG. 4 is a flowchart illustrating a method of operating a display device, according to an embodiment of the disclosure.

FIG. 4 is a flowchart illustrating a method of operating a display device, according to an embodiment of the disclosure.

Referring to FIG. 4, the display device 100 may obtain a first character string by determining whether there is at least one character on a play screen of content by using a character recognition model, and recognizing a character string including at least one character when the at least one character is determined to be on the play screen of the content, in operation S410.

The display device 100 may determine whether there is a character on each of at least one play screen being displayed, while playing the content.

In an embodiment of the disclosure, the display device 100 may recognize a character area on a play screen determined to have a character.

The display device 100 may obtain the first character string by recognizing a character string including at least one character in the recognized character area.

The display device 100 may use the character recognition model to determine whether there is a character on the play screen, recognize a character area on the play screen and recognize a character string including at least one character in the recognized character area.

In an embodiment of the disclosure, the character recognition model may be an AI model.

In an embodiment of the disclosure, the character recognition model may include at least one sub-model.

In an embodiment of the disclosure, the character recognition model may be various character recognition algorithms instead of the AI model.

The display device 100 may obtain a second character string including at least one character by using a speech recognition model to determine whether there is speech in audio data included in a play section where there is at least one character, recognize the speech when the speech is determined to be in the audio data, and convert the recognized speech into a character string, in operation S420.

The display device 100 may determine whether there is a human voice, i.e., a speech, in the audio data included in the play section where a play screen of the content determined to have at least one character in operation S410 is displayed.

When there is speech, the display device 100 may obtain the second character string including at least one character by recognizing the speech and converting the recognized speech into a character string.

The display device 100 may use the speech recognition model to perform a series of operations of determining whether there is a human voice, a speech in the audio data, recognizing the speech, and converting the recognized speech into a character string.

In an embodiment of the disclosure, the speech recognition model may be an AI model.

In an embodiment of the disclosure, the speech recognition model may include a plurality of sub-models.

In an embodiment of the disclosure, the speech recognition model may be various speech recognition algorithms instead of the AI model.

The display device 100 may update the character recognition model based on a mismatched part by comparing the first character string with the second character string, in operation S430.

The display device 100 may identify the mismatched part by comparing the first character string obtained through the character recognition model with the second character string obtained through the speech recognition model.

The display device 100 may update the character recognition model by identifying a part of the first character string that is not matched with the second character string obtained using the speech recognition model based on the second character string.

The display device 100 may extract an image feature of the part of the first character string that is not matched with the second character string, and update the character recognition model based on the extracted feature.

The display device 100 may update the character recognition model so that the feature extracted from the mismatched part matches the same character string as the character string obtained through the speech recognition model. This will be described in detail in connection with FIG. 12.

Figure 5:
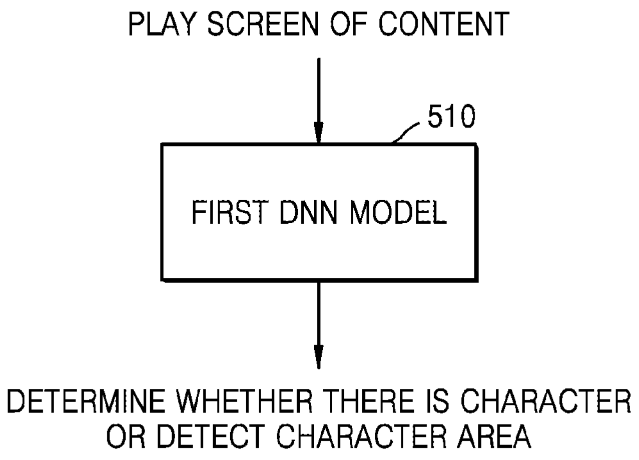
FIG. 5 is a flowchart illustrating a method of operating a display device including determining whether there is a character on a content play screen or detecting a character area by using an artificial intelligence (AI) model, according to an embodiment of the disclosure.

FIG. 5 is a flowchart illustrating a method of operating a display device including determining whether there is a character on a content play screen or detecting a character area by using an AI model, according to an embodiment of the disclosure.

In an embodiment of the disclosure, the display device 100 may obtain a first character string by using a character recognition model to determine whether there is at least one character on a play screen of content, and recognize a character string including the at least one character when the at least one character is determined to be on the play screen of the content.

In an embodiment of the disclosure, the character recognition model may include a first character recognition model and a second character recognition model.

In an embodiment of the disclosure, the display device 100 may use the first character recognition model to determine whether there is at least one character on the play screen of the content and when there is at least one character, detect a character area expected to have a character among the entire play screen of the content. The display device 100 may use the second character recognition model to identify a character in the detected character area.

The embodiment of the disclosure of FIG. 5 may be about the first character recognition model.

In the embodiment of the disclosure of FIG. 5, the display device 100 may use image data obtained by capturing the play screen of the content to determine whether there is a character in the image or detect a character area.

In an embodiment of the disclosure of FIG. 5, the display device 100 may use a neural network 510 trained to use the image data obtained by capturing the play screen of the content to determine whether there is a character in the image, to determine whether there is a character in the image.

In the embodiment of the disclosure of FIG. 5, the display device 100 may use the neural network 510 trained to detect a character area by using the image data obtained by capturing the play screen of the content, to detect a character area when a character is determined to be in the character area.

In other words, in the embodiment of the disclosure of FIG. 5, the display device 510 may use the image data obtained by capturing the play screen of the content to determine whether there is a character in the image or detect a character area.

In an embodiment of the disclosure, the display device 100 may omit the operation of determining whether there is a character in the image, and may assume that there is a character when the character area is detected.

In an embodiment of the disclosure, the first character recognition model and the second character recognition model may be AI models.

AI is a computer system that embodies human-level intelligence allowing a machine to learn and make decisions by itself, and the more it is used the better the recognition rate is. The AI technology includes a machine learning (deep learning) technology that uses an algorithm for self-classifying/self-learning features of input data, and elemental technologies that use a machine learning algorithm to simulate such a function as perception, determination, or the like of a human brain.

For example, the elemental technologies may include at least one of a language understanding technology to recognize human languages/text, a visual understanding technology to recognize an object like human vision, an inference/prediction technology to determine and logically infer and predict information, a knowledge expression technology to process human experience information into knowledge data, or an operation control technology to control autonomous driving of vehicles or motion of robots.

Functions related to AI according to embodiments of the disclosure are operated through the processor 110 and the memory 120. The processor 110 may include one or more processors. The one or more processors may include a universal processor such as a central processing unit (CPU), an application processor (AP), a digital signal processor (DSP), etc., a graphic processing unit (GPU), a vision processing unit (VPU), etc., or a dedicated artificial intelligence (AI) processor such as a neural processing unit (NPU). The one or more processors 110 may control processing of input data according to a predefined operation rule or an AI model stored in the memory 120. When the one or more processors 110 are the dedicated AI processors, they may be designed in a hardware structure that is specific to dealing with a particular AI model.

The predefined operation rule or the AI model may be made by learning. Specifically, a predefined operation rule or an AI model being made by learning refers to the predefined operation rule or the AI model established to perform a desired feature (or an object) being made when a basic AI model is trained by a learning algorithm with a lot of training data. Such learning may be performed by the display device 100 itself in which AI is performed according to the disclosure, or by a separate server 200 and/or system. Examples of the learning algorithm may include supervised learning, unsupervised learning, semi-supervised learning, or reinforcement learning, without being limited thereto.

The AI model may include a plurality of neural network layers. Each of the plurality of neural network layers may have a plurality of weight values, and perform neural network operation through operation between an operation result of the previous layer and the plurality of weight values. The plurality of weight values owned by the plurality of neural network layers may be optimized by learning results of the AI model. For example, the plurality of weight values may be updated to reduce or minimize a loss value or a cost value obtained by the AI model during a training procedure.

In an embodiment of the disclosure where a deep learning algorithm is used, the processor 110 may use a pre-trained deep neural network (DNN) model 510 to determine whether there is a character on a play screen or detect a character area.

The pre-trained DNN model 510 may be an AI model trained by learning with an input value of image data of content play screen to output a value of a determination of whether there is a character on the play screen or a detected character area.

The DNN model may be, for example, a convolutional neural network (CNN) model. It is not limited thereto, and the DNN model may be a well-known AI model including at least one of a recurrent neural network (RNN) model, a restricted Boltzmann machine (RBM) model, a deep belief network (DBN) model, a bidirectional recurrent deep neural network (BRDNN) model or a deep Q-network model.

In an embodiment of the disclosure, the display device 100 may use a deep learning model such as mobilenetv2_ssd or resnet to detect a character area.

The display device 100 may use other various machine learning algorithms to embody the method of determining whether there is a character on the play screen and the method of detecting a character area.

Although, in the embodiment of the disclosure of FIG. 5, the display device 100 is shown as using the same neural network 510 to determine whether there is a character on the play screen or detect a character area, it is not limited thereto.

In an embodiment of the disclosure, the display device 100 may use different neural networks to determine whether there is a character in an image and detect a character area, respectively. For example, the display device 100 may use a neural network trained to determine whether there is a character in an image and a neural network trained to detect a character area.

In an embodiment of the disclosure, the display device 100 may use a neural network trained to use the image data obtained by capturing the play screen of the content to determine whether there is a character in the image, to determine whether there is a character on the play screen. When a character is determined to be on the play screen, the display device 100 may input the image data obtained by capturing the play screen of the content to another neural network trained to detect a character area, to detect a character area in the image.

Figure 6:
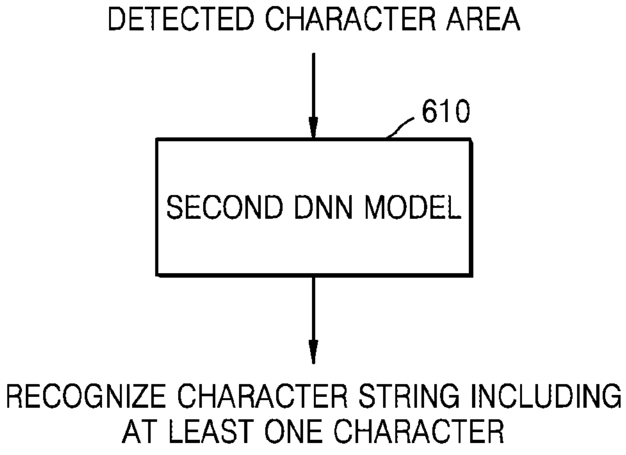
FIG. 6 is a flowchart illustrating a method of operating a display device including recognizing a character string included in a character area by using an AI model, according to an embodiment of the disclosure.

FIG. 6 is a flowchart illustrating a method of operating a display device including recognizing a character string included in a character area by using an AI model, according to an embodiment of the disclosure.

In an embodiment of the disclosure, the display device 100 may obtain a first character string by using the character recognition model to recognize a character string including at least one character when there is the at least one character on the play screen of the content.

In an embodiment of the disclosure, the character recognition model may include a first character recognition model and a second character recognition model.

In an embodiment of the disclosure, the display device 100 may use the first character recognition model to determine whether there is at least one character on the play screen of the content and when there is at least one character, detect a character area. The display device 100 may use the second character recognition model to recognize a character in the detected character area.

In the embodiment of the disclosure of FIG. 6, the display device 100 may input the character area output from the first DNN model 510 to the second character recognition model, and recognize a character in the character area.

The embodiment of the disclosure of FIG. 6 may be about the second character recognition model.

In the embodiment of the disclosure of FIG. 6, the display device 100 may use a neural network 610 trained to use image data about the detected character area to recognize a character in the image, to recognize a character in the character area.

In an embodiment of the disclosure, the first character recognition model and the second character recognition model may be AI models.

For the AI models, descriptions overlapping what is described in FIG. 5 will not be repeated.

In an embodiment of the disclosure where a deep learning algorithm is used, the processor 110 may use a pre-trained DNN model 610 to recognize a character in the detected character area.

The pre-trained DNN model 610 may be an AI model trained by learning with an input value of image data of the detected character area to output a value of a recognized character or character string.

The DNN model may be, for example, a CNN model. It is not limited thereto, and the DNN model may be a well-known AI model including at least one of an RNN model, an RBM model, a DBN model, a BRDNN model or a deep Q-network model.

In an embodiment of the disclosure, the display device 100 may use a deep learning model such as a long-short-term memory (LSTM), a gated recurrent unit (GRU) or a transformer to recognize a character from the image data and provide the character or character string.

The display device 100 may use other various machine learning algorithms to embody the method of recognizing a character in the image.

Figure 7:
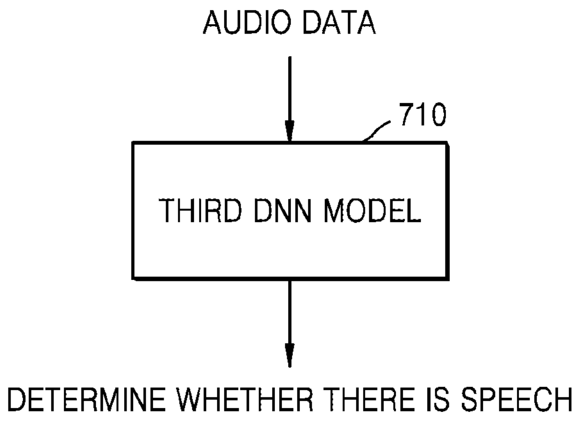
FIG. 7 is a flowchart illustrating a method of operating a display device including determining whether there is speech in audio data of content of content by using an AI model, according to an embodiment of the disclosure.

FIG. 7 is a flowchart illustrating a method of operating a display device including determining whether there is speech in audio data of content by using an AI model, according to an embodiment of the disclosure.

In an embodiment of the disclosure, the display device 100 may use a speech recognition model to determine whether there is speech in audio data included in a part or the whole of a play section of content, and when determining that there is speech, obtain a second character string including at least one character by recognizing the speech and converting the recognized speech into a character string.

In an embodiment of the disclosure, the speech recognition model may include a first speech recognition model and a second speech recognition model.

In an embodiment of the disclosure, the display device 100 may determine whether there is speech by inputting audio data included in a content play section while the first character string recognized in FIG. 6 is displayed to the first speech recognition model, and when determining that there is the speech, obtain the second character string including at least one character by inputting the audio data to the second speech recognition model to recognize a speech and convert the recognized speech into a character string.

In the embodiment of the disclosure of FIG. 7, the display device 100 may determine whether there is a human voice, i.e., a speech, by inputting audio data included in the content play section while the first character string recognized in FIG. 6 is displayed to the first speech recognition model.

The embodiment of the disclosure of FIG. 7 may be about the first speech recognition model.

In the embodiment of the disclosure of FIG. 7, the display device 100 may determine whether there is speech by using a neural network 710 trained to recognize whether there is speech based on audio data included in the content.

In an embodiment of the disclosure, the first speech recognition model and the second speech recognition model may be AI models.

For the AI models, descriptions overlapping what is described in FIG. 5 will not be repeated.

In an embodiment of the disclosure where a deep learning algorithm is used, the processor 110 may use a pre-trained DNN model 710 to determine whether the input audio data includes a speech.

The pre-trained DNN model 710 may be an AI model trained by learning with an input value of audio data included in a certain play section of the content to output a value of determination of whether the audio data includes a speech.

The DNN model may be, for example, a CNN model. It is not limited thereto, and the DNN model may be a well-known AI model including at least one of an RNN model, an RBM model, a DBN model, a BRDNN model or a deep Q-network model.

In an embodiment of the disclosure, the display device 100 may use a deep learning model such as an LSTM or GRU to determine whether there is speech in the audio data.

The display device 100 may use other various machine learning algorithms to embody the method of determining whether there is speech in the audio data.

Figure 8:
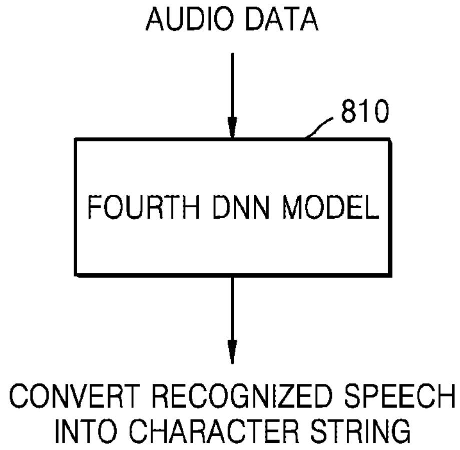
FIG. 8 is a flowchart illustrating a method of operating a display device including recognizing speech included in audio data of content of content and converting the speech into a character string by using an AI model, according to an embodiment of the disclosure.

FIG. 8 is a flowchart illustrating a method of operating a display device including recognizing a speech included in audio data of content and converting the speech into a character string by using an AI model, according to an embodiment of the disclosure.

In an embodiment of the disclosure, the display device 110 may input audio data included in a part or the whole of the play section of the content to a speech recognition model, and when there is speech, recognize the speech and convert the recognized speech to a character string to obtain a second character string including at least one character.

In an embodiment of the disclosure, the speech recognition model may include a first speech recognition model and a second speech recognition model.

In an embodiment of the disclosure, the display device 100 may determine whether there is speech by inputting audio data included in a content play section while the first character string recognized in FIG. 6 is displayed to the first speech recognition model, and when determining that there is the speech, obtain the second character string including at least one character by inputting the audio data to the second speech recognition model to recognize a speech and convert the recognized speech into a character string.

In an embodiment of the disclosure of FIG. 8, when determining that there is speech in the audio data included in the content play section while the first character string recognized in FIG. 6 is displayed, the display device 100 may input the audio data to the second speech recognition model, to recognize a speech and convert the recognized speech into the character string, thereby obtaining the second character string including at least one character.

The embodiment of the disclosure of FIG. 8 may be about the second speech recognition model.

In the embodiment of the disclosure of FIG. 8, the display device 100 may use a neural network 810 trained to recognize a speech based on the audio data and convert the recognized speech into characters, to convert the recognized speech into characters.

In an embodiment of the disclosure, the first speech recognition model and the second speech recognition model may be AI models.

For the AI models, descriptions overlapping what is described in FIG. 5 will not be repeated.

In an embodiment of the disclosure where a deep learning algorithm is used, the processor 110 may use the pre-trained DNN model 810 to recognize speech from the audio data and convert the recognized speech into text.

The pre-trained DNN model 810 may be an AI model trained by learning with an input value of the audio data to output a value of a character or character string obtained by converting the recognized speech.

The DNN model may be, for example, a CNN model. It is not limited thereto, and the DNN model may be a well-known AI model including at least one of an RNN model, an RBM model, a DBN model, a BRDNN model or a deep Q-network model.

In an embodiment of the disclosure, the display device 100 may use a deep learning model such as an LSTM to recognize a speech from the audio data and convert the recognized speech into characters.

The display device 100 may use other various machine learning algorithms to embody the method of recognizing a speech from the audio data and converting the recognized speech into characters.

In the embodiments of FIGS. 7 and 8, the display device 100 uses different neural networks 710 and 810 to determine whether there is speech in the audio data, and detect a speech from the audio data and convert the speech into characters, respectively, but the speech recognition model is not limited thereto. For example, the display device 100 may use the same neural network to determine whether there is speech in the audio data and detect the speech from the audio data and covert the speech into characters.

In an embodiment of the disclosure, the display device 100 may omit the operation of determining whether there is speech in the audio data, and may assume that there is speech when a speech is detected.

Figure 9:
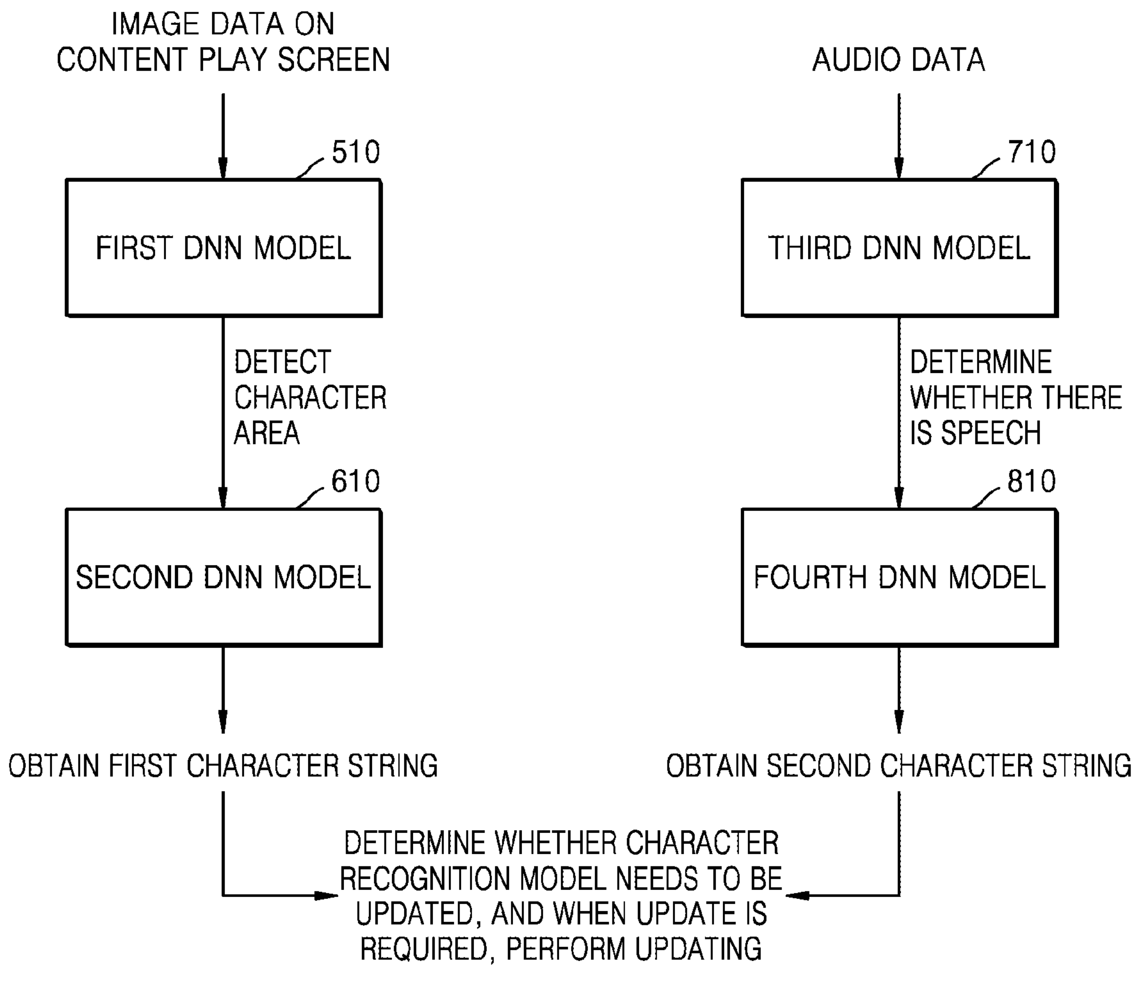
FIG. 9 is a flowchart illustrating a method of operating a display device by using a plurality of AI models, according to an embodiment of the disclosure.

FIG. 9 is a flowchart illustrating a method of operating a display device by using a plurality of AI models, according to an embodiment of the disclosure.

In an embodiment of the disclosure, the display device 100 may determine whether there is at least one character on a play screen by inputting image data obtained by capturing the play screen of content to the first character recognition model 510, and when there is at least one character, detect a character area. The display device 100 may input the detected character area to the second character recognition model 610 to recognize a character in the detected character area, thereby obtaining the first character string.

In an embodiment of the disclosure, the display device 100 may determine whether there is speech by inputting audio data included in a content play section while the first character string is displayed to the first speech recognition model 710, and when determining that there is speech, obtain the second character string including at least one character by inputting a speech to the second speech recognition model 810 to recognize a speech and convert the recognized speech into the character string.

In an embodiment of the disclosure, the display device 100 may determine whether there is speech by inputting audio data included in the content play screen to the first speech recognition model 710. In this case, the content play screen may be the same as the content play screen input to the first character cognition model 510. When determining that there is speech, the display device 100 may recognize a speech by inputting the speech until the speech is separated from a next speech by at least a certain time interval, and obtain the second character string including at least one character by converting the recognized voice into the character string.

The display device 100 may determine whether the character recognition model needs to be updated by comparing the first character string obtained through the at least one character recognition model with the second character string obtained through the at least one speech recognition model.

The display device 100 may update the character recognition model when determining that the update is required.

How to perform the updating will be described in detail in connection with FIG. 11.

Figure 10:
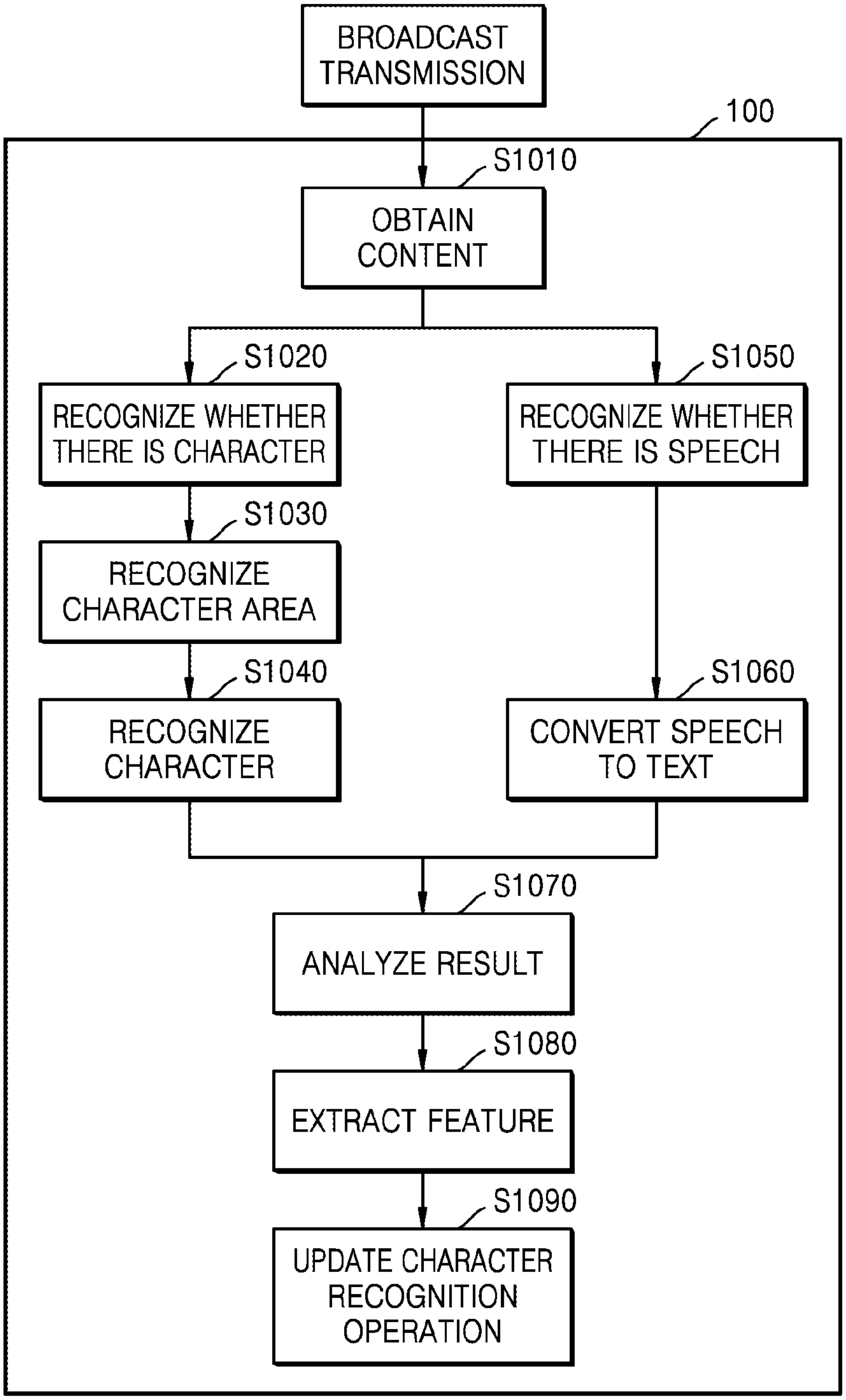
FIG. 10 is a flowchart illustrating a method of operating a display device, according to an embodiment of the disclosure.

FIG. 10 is a flowchart illustrating a method of operating a display device, according to an embodiment of the disclosure.

Referring to FIG. 10, the display device 100 may obtain a content in various manners, in operation S1010.

For example, the display device 100 may obtain, from an external imaging device or a cable equipment, a content transmitted from a broadcasting station. How the display device 100 obtains a content is not limited to a particular manner. The display device 100 may play the obtained content.

The display device 100 may recognize whether there is a character on a play screen of the content, in operation S1020. In an embodiment of the disclosure, the display device 100 may use a deep learning model for detection of whether there is a character, to determine whether there is a character on the play screen. In an embodiment of the disclosure, the display device 100 may use an algorithm instead of the deep learning model to determine whether there is a character on the play screen.

When determining that there is a character on the play screen, the display device 100 may perform the next operation. When determining that there is not any character on the play screen, the display device 100 may stop proceeding the operation related to the current play screen.

When determining that there is a character on the play screen, the display device 100 may recognize a character area, in operation S1030.

In the disclosure, the character area may refer to a portion of an image determined to have a character among the entire input image.

In an embodiment of the disclosure, the display device 100 may use a deep learning model for character area detection to detect an area determined to have a character. In an embodiment of the disclosure, the display device 100 may use an algorithm instead of the deep learning model to detect an area determined to have a character.

In an embodiment of the disclosure, the display device 100 may omit the operation of recognizing whether there is a character for efficient use of resources. In this case, the display device 100 may assume, after detection of a character area, that there is a character.

The display device 100 may recognize a character in the recognized character area, in operation S1040.

In an embodiment of the disclosure, the display device 100 may use a deep learning model for character recognition to recognize a character in an input image. The input image may be the character area detected in operation S1030. In an embodiment of the disclosure, the display device 100 may use an algorithm, instead of the deep learning model, to recognize a character in an input image.

Operations S1020, S1030 and S1040 may correspond to a character recognition operation.

The display device 100 may obtain the first character string by recognizing at least one character on a play screen in operations S1020, S1030 and S1040.

The display device 100 may recognize whether audio data of the content includes a speech, in operation S1050.

In an embodiment of the disclosure, the audio data of the content may refer to audio data corresponding to the play screen used in the character recognition operation.

In an embodiment of the disclosure, the audio data of the content may refer to audio data included in the play screen used in the character recognition operation.

In an embodiment of the disclosure, when there is a term of at least a certain interval between audio data of the content, the display device 100 may recognize the term as an end of a sentence. The display device 100 may perform operation S1010 to S1090 for each sentence.

In an embodiment of the disclosure, the display device 100 may use a deep learning model for detection of whether there is speech, to recognize whether there is speech in the audio data. In an embodiment of the disclosure, the display device 100 may use an algorithm instead of the deep learning model to recognize whether the audio data contains a speech.

When determining that there is speech in the audio data, the display device 100 may perform the next operation. When determining that there is not any speech in the audio data, the display device 100 may stop proceeding the operation related to the input audio data.

The display device 100 may recognize a speech in the audio data and convert the recognized speech into a character or a character string, in operation S1060.

In an embodiment of the disclosure, the display device 100 may use a deep learning model for speech recognition to recognize a speech and convert it into characters. In an embodiment of the disclosure, the display device 100 may use an algorithm, instead of the deep learning model, to recognize a speech in the audio data and convert it into characters.

Operations S1050 and 1060 may correspond to a speech recognition operation.

The display device 100 may obtain the second character string by recognizing a speech contained in the audio data in operations S1050 and S1060.

In an embodiment of the disclosure, the display device 100 may perform the speech recognition operation, i.e., S1050 and S1060 earlier than or simultaneously with the character recognition operation, e.g., S1020, S1030 and S1040.

The display device 100 may use the first character string and the second character string to analyze the character recognition result and the speech recognition result, in operation S1070.

The display device 100 may compare the character recognition result with the speech recognition result to determine whether there is a mismatched part.

In an embodiment of the disclosure, the display device 100 may compare the first character string with the second character string on a character basis to determine whether there is a mismatched part.

In an embodiment of the disclosure, the display device 100 may determine whether the first character string and the second character string are recognized in the same language.

In an embodiment of the disclosure, when the first character string and the second character string are determined to be recognized in the same language, the display device 100 may compare the character recognition result with the speech recognition result to determine whether there is a mismatched part.

In an embodiment of the disclosure, the display device 100 may use a character string matching algorithm such as Knuth-Morris-Pratt (KMP) or Z-array to compare the character recognition result with the speech recognition result.

Although the speech recognition result shows higher accuracy than the character recognition result, it is also likely to have an error, so the display device 100 may increase reliability in the speech recognition result by performing the speech recognition several times in an embodiment of the disclosure.

In an embodiment of the disclosure, the display device 100 may determine a part of the character recognition result mismatched with the speech recognition result as an error of the character recognition result.

The display device 100 may extract a feature of the image from the part determined to have an error in the character recognition result, in operation S1080.

The display device 100 may extract a feature of the play screen of the content or the character area.

The display device 100 may use the extracted feature to update the character recognition operation, in operation S1090.

In an embodiment of the disclosure, the display device 100 may use the extracted feature to update at least one of operations S1020, S1030 or S1040.

In an embodiment of the disclosure, the display device 100 may update operation S1020 of recognizing whether there is a character by re-matching the feature extracted from the image data of the play screen and the character presence/absence recognition result.

In an embodiment of the disclosure, the display device 100 may train the character presence/absence recognition model to obtain the same result as the speech recognition result based on the feature extracted from the image data of the play screen for operation S1020 of recognizing whether there is a character.

In an embodiment of the disclosure, the display device 100 may update operation S1030 of recognizing a character area by re-matching the feature extracted from the image data of the play screen and the character area detection result.

In an embodiment of the disclosure, the display device 100 may train the character area recognition model to obtain the same result as the speech recognition result based on the feature extracted from the image data of the play screen for operation S1030 of recognizing a character area.

In an embodiment of the disclosure, the display device 100 may update operation S1040 of recognizing a character by re-matching the feature extracted from the image data of the character area and the character recognition result.

In an embodiment of the disclosure, the display device 100 may train the character recognition model to obtain the same result as the speech recognition result based on the feature extracted from the image data of the character area for operation S1040 of recognizing a character.

The display device 100 may perform a subsequent character recognition operation by reflecting the updated result.

Figure 11:
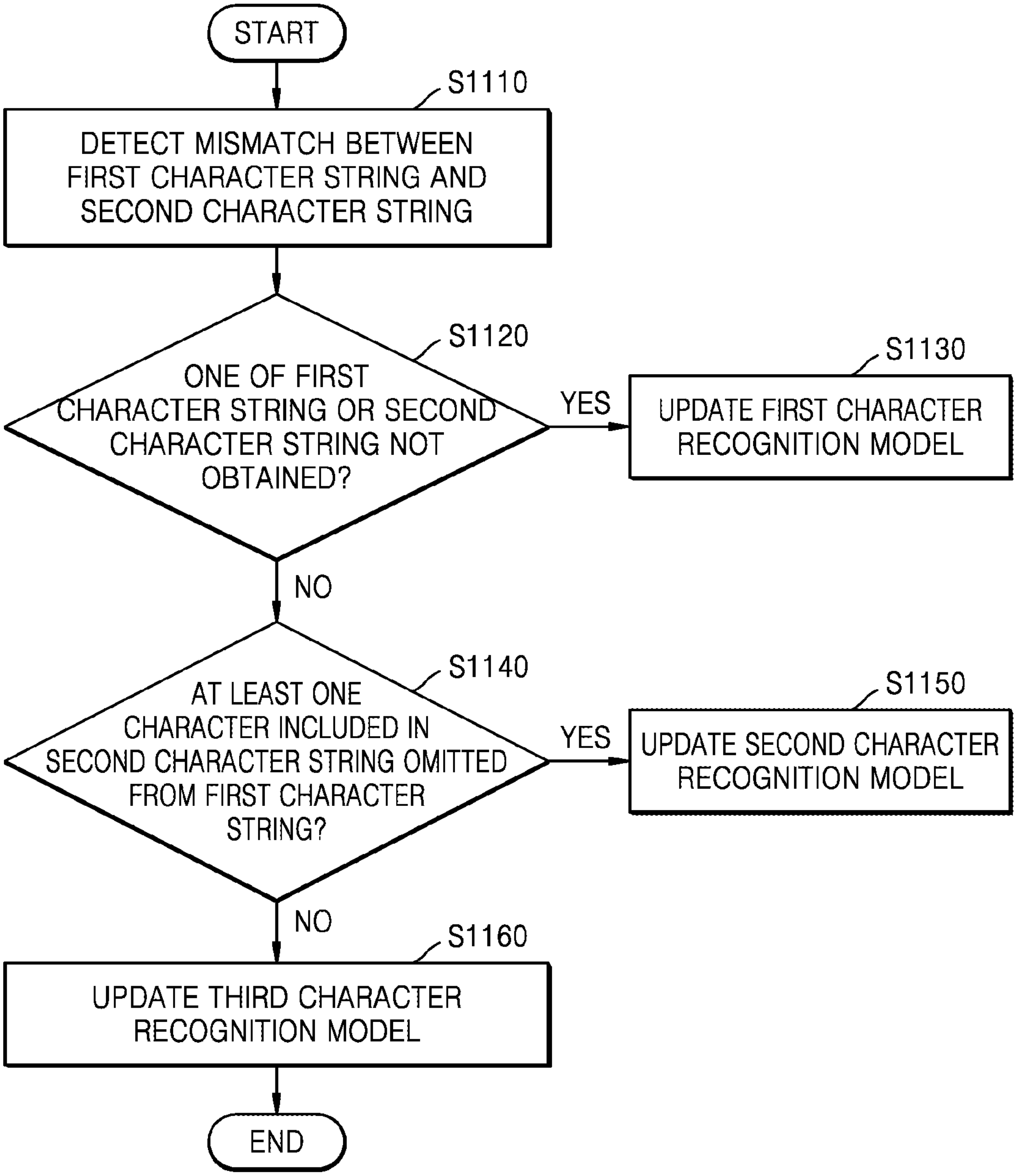
FIG. 11 is a flowchart illustrating a method of operating a display device including updating a character recognition model, according to an embodiment of the disclosure.

FIG. 11 is a flowchart illustrating a method of operating a display device including updating a character recognition model, according to an embodiment of the disclosure.

The display device 100 may detect a mismatch between the first character string and the second character string, in operation S1110.

Operation S1110 may have a result of determining whether there is a mismatched part by comparing the character recognition result with the speech recognition result by analyzing the character recognition result and the speech recognition result based on the first character string and the second character string in operation S1070 of FIG. 10.

When a mismatch between the first character string and the second character string is detected, the display device 100 may check whether one of the first character string and the second character string is not obtained, in operation S1120.

In an embodiment of the disclosure, an occasion when the second character string is obtained yet the first character string is not obtained may correspond to an occasion when the display device 100 fails to recognize a caption.

In an embodiment of the disclosure, an occasion when the first character string is obtained yet the second character string is not obtained may correspond to an occasion when the display device 100 recognizes that there is a character even without a speech.

In other words, an occasion when one of the first character string or the second character string is not obtained may correspond to an occasion when the display device 100 wrongly recognizes whether there is a character. Hence, when one of the first character string or the second character string is not obtained, the display device 100 may update the first recognition model, a model for recognizing whether there is a character, in operation S1130.

When both the first character string and the second character string are obtained, the display device 100 may determine whether at least one character included in the second character string is omitted from the first character string, in operation S1140.

In an embodiment of the disclosure, an occasion when at least one character included in the second character string obtained by a speech recognition model is omitted from the first character string obtained by a character recognition model may result from wrong recognition of the character area by the display device 100.

Accordingly, when the at least one character included in the second character string is omitted from the first character string, the display device 100 may update the second character recognition model, a model for recognizing a character area, in operation S1150.

In an embodiment of the disclosure, the display device 100 may not recognize some caption area as a character area when a character in the caption has the same color as part of the background screen.

When there is no error in the first recognition model, a model for recognizing whether there is a character or the second character recognition model, a model for character area recognition, the display device 100 may update the third character recognition model for identifying a character, in operation S1160.

The occasion when there is no error in the first recognition model, a model for recognizing whether there is a character or the second character recognition model, a model for character area recognition may correspond to an occasion when both the first character string and the second character string are obtained and some characters are not matched between the first character string and the second character string although the number of characters of the first character string is the same as that of the second character string because at least one character included in the second character string is not omitted from the first character string.

This may correspond to the embodiment of the disclosure of FIG. 1 where a character recognition result is "I am the one who creates eappiness" and a speech recognition result is "I am the one who creates happiness".

FIG. 12 is a diagram illustrating results when a display device repeats a procedure for obtaining a first character string and a second character string five times each, according to an embodiment of the disclosure.

In an embodiment of the disclosure, the display device 110 may repeat, multiple times, operations of inputting audio data included in a play section where there is at least one character to a speech recognition model, and when there is speech, recognizing the speech and converting the recognized speech into a character string.

In an embodiment of the disclosure, the display device 100 may obtain the most frequent value of the converted character string as a speech recognition result, the second character string.

In the embodiment of the disclosure of FIG. 12, the display device 110 may repeat, 5 times, operations of inputting audio data to a speech recognition model, and when there is speech, recognizing the speech and converting the recognized speech into a character string. That is, the display device 100 may repeat the speech recognition operation 5 times.

As a result, the display device 100 may obtain "patent" as a resultant value of the first time speech recognition, "patent" as a resultant value of the second time speech recognition, "parent" as a resultant value of the third time speech recognition, "fatent" as a resultant value of the fourth time speech recognition, and "patent" as a resultant value of the fifth time speech recognition.

In an embodiment of the disclosure, the display device 100 may determine the most frequent value "patent" as the second character string that is a speech recognition result, among the resultant values from performing the speech recognition 5 times.

As such, the display device 100 may reduce possibility of errors in speech recognition by performing the speech recognition multiple times.

In the meantime, the display device 100 may repeat the character recognition operation 5 times as well.

In the embodiment of the disclosure of FIG. 12, the display device 100 may obtain "patent" as a resultant value of the first time character recognition, "parent" as a resultant value of the second time character recognition, "parent" as a resultant value of the third time character recognition, "patent" as a resultant value of the fourth time character recognition, and "parent" as a resultant value of the fifth time character recognition.

In an embodiment of the disclosure, the display device 100 may determine the most frequent value "parent" as the first character string that is a character recognition result, among the resultant values from performing the character recognition 5 times.

In an embodiment of the disclosure, as "parent" obtained as the first character string is not equal to "patent" obtained as the second character string, the display device 100 may detect a mismatch between the speech recognition result and the character recognition result.

When this is applied to the embodiment of the disclosure of FIG. 11, there is no error in the first recognition model, a model for recognizing whether there is a character or the second character recognition model, a model for character area recognition, so the display device 100 may update the third character recognition model for identifying a character, in operation S1160.

In the embodiment of the disclosure of FIG. 11, the display device 100 may train the third character recognition model for identifying a character to recognize "patent" for the content play screen in the same way as the speech recognition result.

Figure 13:
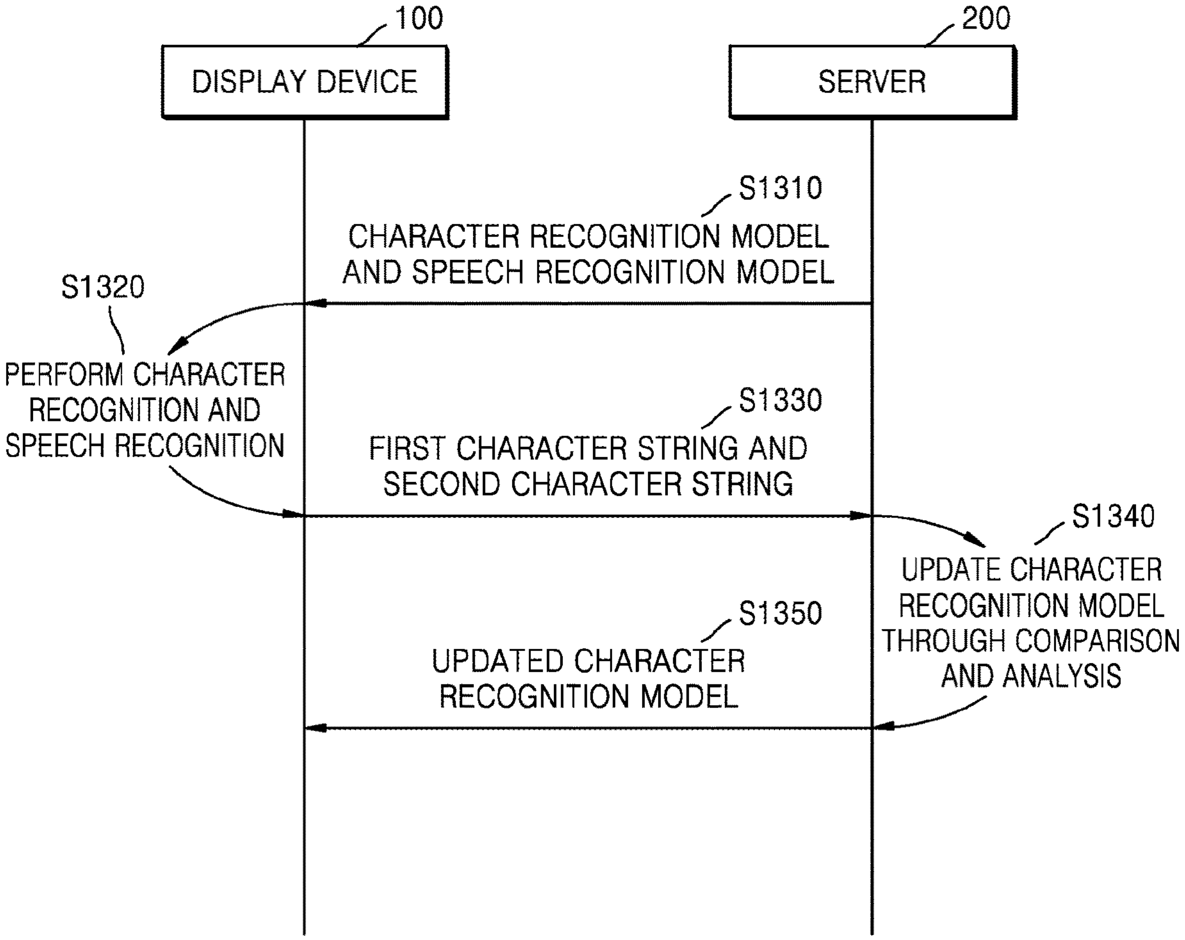
FIG. 13 is a flowchart illustrating a method of operating a display device by using a server, according to an embodiment of the disclosure.

FIG. 13 is a flowchart illustrating a method of operating a display device by using a server, according to an embodiment of the disclosure.

In an embodiment of the disclosure, the display device 100 may allow some of operations in FIG. 4, 10 or 11 to be performed by the server 200 or an external device.

In the embodiment of the disclosure of FIG. 13, the display device 100 may obtain a character recognition model and a speech recognition model from the server 200, in operation S1310.

The display device 100 may use the character recognition model and the speech recognition model obtained from the server 200 to perform character recognition and speech recognition on a content being played, in operation S1320.

The display device 100 may transmit a first character string obtained as a character recognition result and a second character string obtained as a speech recognition result to the server 200, in operation S1330.

The server 200 may update the character recognition model stored in the server 200 by comparing the first character string obtained as a character recognition result with the second character string obtained as a speech recognition result and analyzing a result of the comparing, in operation S1340.

To update the character recognition model, the server 200 may perform operation S430 of FIG. 4, operations S1070 to S1090 of FIG. 10 or the entire operations shown in FIG. 11.

The server 200 may transmit the updated character recognition model to the display device 100, in operation S1350.

The display device 100 may obtain the updated character recognition model from the server 200 and use it to perform operations S1310 and S1320 on a content to be played later.

An embodiment of the disclosure in which the server 200 separately performs some operations in the method of operating the display device 100 shown in FIG. 4 is not limited to that of FIG. 13, but may be implemented in other various manners.

Figure 14:
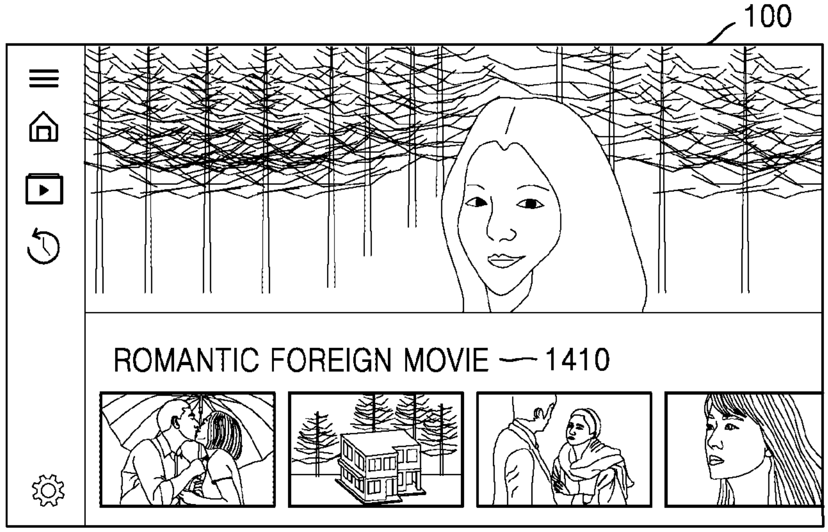
FIG. 14 is a diagram illustrating a display device using a character recognition model, according to an embodiment of the disclosure.

FIG. 14 is a diagram illustrating a display device using a character recognition model, according to an embodiment of the disclosure.

As described above, the display device 100 may perform various character-recognition based functions and services by automatically updating the character recognition model.

For example, the display device 100 may recognize a caption included on a play screen of content and provide a visually impaired person with the caption in speeches.

For example, the display device 100, which is remotely located from the user, may recognize a caption included on a play screen of content, and transmit the caption on the content play screen displayed on the display device 100 to a cell phone of the user, thereby allowing the user at a distance to easily recognize the caption included on the content play screen.

For example, the display device 100 may recognize a caption or characters included on the content play screen, translate the recognized content into a language desired by the user, and provide a result of the translating to the user.

For example, the display device 100 may recognize what application it is that a menu being used by the user belongs to by recognizing characters included on a screen being manipulated by the user, and activate a button or menu corresponding to the application.

For example, the display device 100 may recognize that the user is using a menu of Netflix by recognizing characters included on a displayed screen, and activate a button dedicated to Netflix on a remote controller connected to the display device 100.

In the embodiment of the disclosure of FIG. 14, the display device 100 may recognize that the user often searches for a movie in a romantic foreign movie category by recognizing "romantic foreign movies" among characters included on a menu screen, and use it for content recommendations for the user.

The method of operating the display device 100 according to an embodiment of the disclosure may be implemented in the form of a computer-readable medium including instructions executable by a computer such as a program module to be executed by the computer. The computer-readable medium may be an arbitrary available medium that may be accessed by the computer, including volatile, non-volatile, removable, and non-removable mediums. The computer-readable media may include program instructions, data files, data structures, etc., separately or in combination. The program instructions recorded on the computer-readable media may be designed and configured specially for the disclosure, or may be well-known to those of ordinary skill in the art of computer software. Examples of the computer readable recording medium include magnetic media including hard disks, magnetic tapes, and floppy disks, optical media including compact disc read only memory (CD-ROM), and digital versatile discs (DVDs), magneto-optical media including floptical disks, and a hardware apparatus designed to store and execute the programmed commands in read-only memory (ROM), random-access memory (RAM), flash memories, and the like. Examples of the program instructions include not only machine language codes but also high-level language codes which are executable by a computer using an interpreter.

Several embodiments of the disclosure have been described, but those of ordinary skill in the art will understand and appreciate that various modifications can be made without departing the scope of the disclosure. Thus, it will be apparent to those of ordinary skill in the art that the true scope of technical protection is only defined by the appended claims. Thus, it will be apparent that the disclosure is not limited to the embodiments as described above from every aspect. For example, an element described in the singular form may be implemented as being distributed, and elements described in a distributed form may be implemented as being combined.

In an embodiment of the disclosure, a display device includes a memory for storing one or more instructions and at least one processor, the at least one processor configured to execute the one or more instructions stored in the memory to obtain a first character string by using a character recognition model to determine whether there is at least one character on a play screen of content and recognizing a character string including the at least one character in response to determining that there is the at least one character on the play screen of the content, obtain a second character string including at least one character by using a speech recognition model to determine whether there is speech in audio data included in a play section of the content where there is the at least one character, and recognizing the speech and converting the recognized speech into a character string in response to determining that there is the speech in the audio data, and compare the first character string with the second character string and update the character recognition model based on a mismatched part.

The character recognition model may be an AI model and may include first to third character recognition models.

The at least one processor may execute the one or more instructions stored in the memory to obtain the first character string by using the first character recognition model to determine whether there is at least one character on the play screen of the content, using the second character recognition model to detect a character area on the play screen in response to determining that there is at least one character on the play screen of the content, and using the third character recognition model to recognize a character string including at least one character in the recognized character area.

The at least one processor may execute the one or more instructions stored in the memory to determine that there is an error in the first character recognition model when one of the first character string or the second character string is not obtained, and update the first character recognition model based on the play screen of the content and the second character string.

The at least one processor may execute the one or more instructions stored in the memory to recognize that there is an error in the second character recognition model when at least one character included in the second character string is omitted from the first character string, and update the second character recognition model based on the play screen of the content and the second character string.

The at least one processor may execute the one or more instructions stored in the memory to recognize that there is an error in the third character recognition model when at least one character included in the second character string is not matched with a corresponding character in the first character string, and update the third character recognition model based on the detected character area and the second character string.

The speech recognition model may be an AI model, and may include a first speech recognition model and a second speech recognition model.

The at least one processor may execute the one or more instructions stored in the memory to obtain the second character string including at least one character by using the first speech recognition model to determine whether there is speech in audio data included in a play section where there is the at least one character, and using the second speech recognition model to recognize the speech and convert the recognized speech into a character string in response to determining that there is speech in the audio data.

The at least one processor may execute the one or more instructions stored in the memory to repeat, multiple times, a procedure for using the speech recognition model to recognize the speech and convert the recognized speech into a character string, and obtain a most frequent value of the converted character string as the second character string.

The at least one processor may execute the one or more instructions stored in the memory to determine whether the first character string and the second character string are recognized in a same language.

The at least one processor may execute the one or more instructions stored in the memory to extract a feature of the mismatched part, and update at least one of the first character recognition model, the second character recognition model, or the third character recognition model based on the extracted feature.

The at least one processor may execute the one or more instructions stored in the memory to determine whether a function of automatically updating the character recognition model is activated.

According to an embodiment of the disclosure, a method of operating the display device 100 includes obtaining a first character string by using a character recognition model to determine whether there is at least one character on a play screen of content and recognizing a character string including the at least one character in response to determining that there is the at least one character on the play screen of the content, obtaining a second character string including at least one character by using a speech recognition model to determine whether there is speech in audio data included in a play section where there is the at least one character, and recognizing the speech and converting the recognized speech into a character string in response to determining that there is the speech in the audio data, and comparing the first character string with the second character string and updating the character recognition model based on a mismatched part.

The character recognition model may be an AI model and may include first to third character recognition models.

The obtaining of the first character string may include using the first character recognition model to determine whether there is at least one character on the play screen of the content, using the second character recognition model to detect a character area on the play screen in response to determining that there is at least one character on the play screen of the content, and using the third character recognition model to recognize a character string including the at least one character in the recognized character area, thereby obtaining the first character string.

The comparing of the first character string with the second character string and the updating of the character recognition model based on a mismatched part may include determining that there is an error in the first character recognition model when one of the first character string or the second character string is not obtained, and updating the first character recognition model based on the play screen of the content and the second character string.

The comparing of the first character string with the second character string and the updating of the character recognition model based on a mismatched part may include recognizing that there is an error in the second character recognition model when at least one character included in the second character string is omitted from the first character string, and updating the second character recognition model based on the play screen of the content and the second character string.

The comparing of the first character string with the second character string and the updating of the character recognition model based on a mismatched part may include recognizing that there is an error in the third character recognition model when at least one character included in the second character string is not matched with a corresponding character in the first character string, and updating the third character recognition model based on the detected character area and the second character string.

The speech recognition model may be an AI model, and may include a first speech recognition model and a second speech recognition model.

The obtaining of the second character string may include using the first speech recognition model to determine whether there is speech in audio data included in a play section where there is the at least one character, using the second speech recognition model to recognize the speech in response to determining that there is the speech in the audio data, and converting the recognized speech into a character string, thereby obtaining the second character string including at least one character.

The obtaining of the second character string may include repeating, multiple times, a procedure for using the speech recognition model to recognize the speech and convert the recognized speech into a character string, and obtaining a most frequent value of the converted character string as the second character string.

The method may further include determining whether the first character string and the second character string are recognized in a same language.

The comparing of the first character string with the second character string and the updating of the character recognition model based on a mismatched part may include extracting a feature of the mismatched part, and updating at least one of the first character recognition model, the second character recognition model, or the third character recognition model based on the extracted feature.

According to an embodiment of the disclosure, a computer-readable recording medium may include a program to embody a method of operating a display device including obtaining a first character string by using a character recognition model to determine whether there is at least one character on a play screen of content and recognizing a character string including the at least one character in response to determining that there is the at least one character on the play screen of the content. According to an embodiment of the disclosure, a computer-readable recording medium may include a program to embody a method of operating a display device including obtaining a second character string including at least one character by using a speech recognition model to determine whether there is speech in audio data included in a play section where there is the at least one character, and recognizing the speech and converting the recognized speech into a character string in response to determining that there is the speech in the audio data, and The computer-readable recording medium may compare the first character string with the second character string to update the character recognition model based on a mismatched part.

In an embodiment of the disclosure, the aforementioned method according to the various embodiments of the disclosure may be provided in a computer program product. The computer program product may be a commercial product that may be traded between a seller and a buyer. The computer program product may be distributed in the form of a storage medium (e.g., a CD-ROM), through an application store, directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

The invention claimed is:

1. A display device comprising:

a memory storing one or more instructions; and at least one processor configured to execute the one or more instructions stored in the memory to:

obtain a first character string by using a character recognition model to determine whether there is at least one character on a play screen of content and recognizing a character string including the at least one character as the first character string in response to determining that there is the at least one character on the play screen of the content, obtain a second character string including at least one character by using a speech recognition model to determine whether there is speech in audio data included in a play section of the content where there is the at least one character, and recognizing the speech and converting the recognized speech into a character string as the second character string in response to determining that there is the speech in the audio data, compare the first character string with the second character string, update the character recognition model based on a mismatch between the first character string and the second character string indicated by the comparing of the first character string with the second character string, and use the updated character recognition model to obtain a subsequent character string.

2. The display device of claim 1, wherein the character recognition model is an artificial intelligence (AI) model and comprises a first character recognition model, a second character recognition model, and a third character recognition model, and the at least one processor is configured to execute the one or more instructions stored in the memory to obtain the first character string by using the first character recognition model to determine whether there is at least one character on the play screen of the content, using the second character recognition model to detect a character area on the play screen in response to determining that there is at least one character on the play screen of the content, and using the third character recognition model to recognize a character string including the at least one character as the first character string in the detected character area.

3. The display device of claim 2, wherein the at least one processor is configured to execute the one or more instructions stored in the memory to:

determine that there is an error in the first character recognition model when one of the first character string or the second character string is not obtained, and update the first character recognition model based on the play screen of the content and the second character string.

4. The display device of claim 2, wherein the at least one processor is configured to execute the one or more instructions stored in the memory to:

recognize that there is an error in the second character recognition model when at least one character included in the second character string is omitted from the first character string, and update the second character recognition model based on the play screen of the content and the second character string.

5. The display device of claim 2, wherein the at least one processor is configured to execute the one or more instructions stored in the memory to:

recognize that there is an error in the third character recognition model when at least one character included in the second character string is not matched with a corresponding character in the first character string, and update the third character recognition model based on the detected character area and the second character string.

6. The display device of claim 2, wherein the at least one processor is configured to execute the one or more instructions stored in the memory to:

extract a feature of a mismatched part indicated by the comparing of the first character string with the second character string, and update at least one of the first character recognition model, the second character recognition model, or the third character recognition model based on the extracted feature.

7. The display device of claim 1, wherein the speech recognition model is an artificial intelligence (AI) model and comprises a first speech recognition model and a second speech recognition model, and the at least one processor is configured to execute the one or more instructions stored in the memory to obtain the second character string by using the first speech recognition model to determine whether there is speech in audio data included in a play section where there is the at least one character, using the second speech recognition model to recognize the speech in response to determining that there is the speech in the audio data, and converting the recognized speech into a character string as the second character string.

8. The display device of claim 1, wherein the at least one processor is configured to execute the one or more instructions stored in the memory to:

repeat, multiple times, a procedure for using the speech recognition model to recognize the speech and convert the recognized speech into a character string, and obtain a most frequent value of the converted character string as the second character string.

9. The display device of claim 1, wherein the at least one processor is configured to execute the one or more instructions stored in the memory to:

determine whether the first character string and the second character string are recognized in a same language.

10. The display device of claim 1, wherein the at least one processor is configured to execute the one or more instructions stored in the memory to:

determine whether a function of automatically updating the character recognition model is activated.

11. A method of operating a display device, the method comprising:

obtaining a first character string by using a character recognition model to determine whether there is at least one character on a play screen of content and recognizing a character string including the at least one character as the first character string in response to determining that there is the at least one character on the play screen of the content;

obtaining a second character string including at least one character by using a speech recognition model to determine whether there is speech in audio data included in a play section where there is the at least one character, and recognizing the speech and converting the recognized speech into a character string as the second character string in response to determining that there is the speech in the audio data;

comparing the first character string with the second character string and updating the character recognition model based on a mismatch between the first character string and the second character string indicated by the comparing of the first character string with the second character string, and using the updated character recognition model to obtain a subsequent character string.

12. The method of claim 11, wherein the character recognition model is an artificial intelligence (AI) model and comprises a first character recognition model, a second character recognition model, and a third character recognition model, and the obtaining of the first character string comprises using the first character recognition model to determine whether there is at least one character on the play screen of the content, using the second character recognition model to detect a character area on the play screen in response to determining that there is at least one character on the play screen of the content, and using the third character recognition model to recognize a character string including at least one character as the first character string in the recognized character area.

13. The method of claim 12, wherein the comparing of the first character string with the second character string and the updating of the character recognition model comprise determining that there is an error in the first character recognition model when one of the first character string or the second character string is not obtained, and updating the first character recognition model based on the play screen of the content and the second character string.

14. The method of claim 12, wherein the comparing of the first character string with the second character string and the updating of the character recognition model comprise recognizing that there is an error in the second character recognition model when at least one character included in the second character string is omitted from the first character string, and updating the second character recognition model based on the play screen of the content and the second character string.

15. The method of claim 12, wherein the comparing of the first character string with the second character string and the updating of the character recognition model comprise recognizing that there is an error in the third character recognition model when at least one character included in the second character string is not matched with a corresponding character in the first character string, and updating the third character recognition model based on the detected character area and the second character string.

16. The method of claim 12, wherein the comparing of the first character string with the second character string and the updating of the character recognition model comprise extracting a feature of a mismatched part between the first character string and the second character string indicated by the comparing of the first character string with the second character string, and updating at least one of the first character recognition model, the second character recognition model, or the third character recognition model based on the extracted feature.

17. The method of claim 11, wherein the speech recognition model is an artificial intelligence model, and comprises a first speech recognition model and a second speech recognition model, and the obtaining of the second character string comprises using the first speech recognition model to determine whether there is speech in audio data included in a play section where there is the at least one character, using the second speech recognition model to recognize the speech in response to determining that there is the speech in the audio data, and converting the recognized speech into a character string as the second character string.

18. The method of claim 11, wherein the obtaining of the second character string comprises repeating, multiple times, a procedure for using the speech recognition model to recognize the speech and convert the recognized speech into a character string, and obtaining a most frequent value of the converted character string as the second character string.

19. The method of claim 11, further comprising:

determining whether the first character string and the second character string are recognized in a same language.

20. A non-transitory computer-readable recording medium having recorded thereon a program for carrying out the method of claim 11, on a computer.

* * * * *